(12) United States Patent
Bresler et al.

(10) Patent No.: US 7,239,747 B2
(45) Date of Patent: Jul. 3, 2007

(54) METHOD AND SYSTEM FOR LOCATING POSITION IN PRINTED TEXTS AND DELIVERING MULTIMEDIA INFORMATION

(75) Inventors: Joel Bresler, Lexington, MA (US); Jack Raffel, Lexington, MA (US)

(73) Assignee: Chatterbox Systems, Inc., Lexington, MA (US)

( * ) Notice: Subject to any disclaimer, the term of this patent is extended or adjusted under 35 U.S.C. 154(b) by 676 days.

(21) Appl. No.: 10/351,277

(22) Filed: Jan. 24, 2003

(65) Prior Publication Data

US 2003/0152293 A1    Aug. 14, 2003

Related U.S. Application Data

(60) Provisional application No. 60/368,371, filed on Mar. 28, 2002, provisional application No. 60/351,456, filed on Jan. 24, 2002.

(51) Int. Cl.
*G06K 9/34* (2006.01)
*G06K 9/20* (2006.01)

(52) U.S. Cl. .................................... 382/176; 382/321

(58) Field of Classification Search ........ 382/173–189, 382/321
See application file for complete search history.

(56) References Cited

U.S. PATENT DOCUMENTS

| | | | |
|---|---|---|---|
| 3,522,155 A | 7/1970 | Dow | 204/43 |
| 4,187,166 A | 2/1980 | Kruper | 204/43 S |
| 4,356,067 A | 10/1982 | McCoy | 204/43 Z |
| 4,389,286 A | 6/1983 | McCoy | 204/44 |
| 4,396,467 A | 8/1983 | Anthony | 204/15 |
| 4,466,864 A | 8/1984 | Bacon et al. | 204/15 |
| 4,496,436 A | 1/1985 | Inoue | 204/23 |
| 4,789,437 A | 12/1988 | Sing et al. | 204/12 |
| 4,855,016 A | 8/1989 | Jucha et al. | 156/643 |
| 4,869,971 A | 9/1989 | Nee et al. | 428/635 |
| 5,084,356 A | 1/1992 | Deak et al. | 428/458 |
| 5,141,602 A | 8/1992 | Chen et al. | 205/103 |
| 5,182,656 A | 1/1993 | Chevion et al. | 358/452 |

(Continued)

FOREIGN PATENT DOCUMENTS

EP         0 048 579         3/1982

(Continued)

OTHER PUBLICATIONS

Haritaoglu, I., "*InfoScope*: Link from Real World to Digital Information Space," IBM Almaden Research, San Jose, CA 95120 (ismailh@almaden.ibm.com).

(Continued)

*Primary Examiner*—Bhavesh M. Mehta
*Assistant Examiner*—Aaron Carter
(74) *Attorney, Agent, or Firm*—Iandiorio & Teska

(57) ABSTRACT

Apparatus and methods are disclosed for processing printed material to provide an index of locations within the printed material that can be associated with external actions such as displaying a graphical image, providing an audio or video output, or providing a multimedia output. The associations are stored in a database. Apparatus and methods are also disclosed that allow a user to image the printed material and by indicating a desired location within the printed material can cause one of the associated actions to be executed.

25 Claims, 23 Drawing Sheets

U.S. PATENT DOCUMENTS

| | | | |
|---|---|---|---|
| 5,203,705 A | 4/1993 | Hardy et al. | 434/169 |
| 5,302,256 A | 4/1994 | Miura et al. | 205/85 |
| 5,369,714 A | 11/1994 | Withgott et al. | 382/9 |
| 5,384,864 A | 1/1995 | Spitz | 382/9 |
| 5,418,002 A | 5/1995 | Paik et al. | 427/96 |
| 5,493,132 A | 2/1996 | Brugge et al. | 257/101 |
| 5,500,919 A | 3/1996 | Luther | 395/2.69 |
| 5,517,407 A | 5/1996 | Weiner | 364/419.01 |
| 5,580,668 A | 12/1996 | Kellam | 428/610 |
| 5,583,956 A | 12/1996 | Aghajan et al. | 382/290 |
| 5,686,705 A | 11/1997 | Conroy et al. | 178/19 |
| 5,689,585 A | 11/1997 | Bloomberg et al. | 382/229 |
| 5,705,230 A | 1/1998 | Matanabe et al. | 427/438 |
| 5,832,530 A | 11/1998 | Paknad et al. | 707/500 |
| 5,833,820 A | 11/1998 | Dubin | 204/212 |
| 5,833,920 A | 11/1998 | Nakanishi et al. | 420/477 |
| 5,877,458 A | 3/1999 | Flowers | 178/18.01 |
| 5,882,425 A | 3/1999 | Graham | 134/1.3 |
| 5,882,498 A | 3/1999 | Dubin et al. | 205/261 |
| 5,902,472 A | 5/1999 | Arai et al. | 205/125 |
| 5,907,790 A | 5/1999 | Kellam | 438/666 |
| 5,911,113 A | 6/1999 | Yao et al. | 438/649 |
| 5,953,451 A | 9/1999 | Syeda-Mahmood | 382/187 |
| 5,985,048 A | 11/1999 | Wahlert et al. | 148/272 |
| 5,985,126 A | 11/1999 | Bleck et al. | 205/123 |
| 6,000,612 A * | 12/1999 | Xu | 235/454 |
| 6,030,512 A | 2/2000 | Ihara et al. | 204/224 R |
| 6,055,522 A | 4/2000 | Krishna et al. | 705/517 |
| 6,064,769 A | 5/2000 | Nakao et al. | 382/224 |
| 6,066,892 A | 5/2000 | Ding et al. | 257/751 |
| 6,076,059 A | 6/2000 | Glickman et al. | 704/260 |
| 6,077,571 A | 6/2000 | Kaloyeros et al. | 427/576 |
| 6,099,712 A | 8/2000 | Ritzdorf et al. | 205/123 |
| 6,110,817 A | 8/2000 | Tsai et al. | 438/618 |
| 6,115,482 A | 9/2000 | Sears et al. | 382/114 |
| 6,120,641 A | 9/2000 | Stevens et al. | 156/345 |
| 6,130,156 A | 10/2000 | Havemann et al. | 438/687 |
| 6,136,163 A | 10/2000 | Cheung et al. | 204/198 |
| 6,143,126 A | 11/2000 | Stevens | 156/345 |
| 6,171,960 B1 | 1/2001 | Lee | 438/687 |
| 6,176,996 B1 | 1/2001 | Moon | 205/254 |
| 6,183,619 B1 | 2/2001 | Gillman et al. | 205/238 |
| 6,195,248 B1 | 2/2001 | Kunishi et al. | 361/305 |
| 6,197,181 B1 | 3/2001 | Chen | 205/123 |
| 6,242,349 B1 | 6/2001 | Nogami et al. | 438/687 |
| 6,245,208 B1 | 6/2001 | Ivey et al. | 205/248 |
| 6,245,672 B1 | 6/2001 | Hong et al. | 438/648 |
| 6,251,249 B1 | 6/2001 | Chevalier et al. | 205/80 |
| 6,267,863 B1 | 7/2001 | Abys et al. | 205/254 |
| 6,277,263 B1 | 8/2001 | Chen | 205/182 |
| 6,290,833 B1 | 9/2001 | Chen | 205/182 |
| 6,303,498 B1 | 10/2001 | Chen et al. | 438/675 |
| 6,303,505 B1 | 10/2001 | Ngo et al. | 438/687 |
| 6,319,387 B1 | 11/2001 | Krishnamoorthy et al. | 205/240 |
| 6,331,490 B1 | 12/2001 | Stevens et al. | 438/754 |
| 6,344,281 B1 | 2/2002 | Smith et al. | 428/651 |
| 6,346,470 B1 | 2/2002 | Nogami et al. | 438/621 |
| 6,358,388 B1 | 3/2002 | Bleck et al. | 205/118 |
| 6,358,848 B1 | 3/2002 | Lopatin | 438/687 |
| 6,368,475 B1 | 4/2002 | Hanson et al. | 204/275.1 |
| 6,368,966 B1 | 4/2002 | Krishnamoorthy et al. | 438/687 |
| 6,376,374 B1 | 4/2002 | Stevens | 438/687 |
| 6,387,805 B2 | 5/2002 | Ding et al. | 438/687 |
| 6,413,404 B1 | 7/2002 | Ihara et al. | 205/133 |
| 6,432,819 B1 | 8/2002 | Pavate et al. | 438/676 |
| 6,478,944 B1 | 11/2002 | Ishiyama | 205/102 |
| 6,525,425 B1 | 2/2003 | Woo et al. | 257/758 |
| 2001/0014408 A1 | 8/2001 | Mitsuhashi et al. | 428/606 |
| 2001/0050233 A1 | 12/2001 | Uzoh et al. | 205/96 |
| 2002/0050628 A1 | 5/2002 | Krishnamoorthy et al. | 257/586 |

FOREIGN PATENT DOCUMENTS

| | | |
|---|---|---|
| EP | 1 091 023 A2 | 4/2001 |
| JP | 2001 172791 | 6/2001 |

OTHER PUBLICATIONS

WizCom Technologies Ltd.—Handheld Scanners and Translators, "Quicktionary," http://www.wizcomtech.com/products1.quicktonary2.php3 (1999-2003).

* cited by examiner

PUBLICATION AFTER LOCATING LINES AND WORD SPACES

| Lincoln's | Gettysburg | Address |

| Four | score | and | seven | years | ago, | our | fathers | brought | forth | upon | this |
| continent | a | new | nation: | conceived | in | liberty, | and | dedicated | to | the | |
| proposition | that | all | men | are | created | equal. | Now | we | are | engaged | in | a |

(more text here)

FIG. 2

PUBLICATION WITH "HOTSPOT" IDENTIFIED

| Lincoln's | Gettysburg | Address |

| ▓▓▓▓▓▓▓▓▓▓▓▓▓▓▓▓▓▓▓▓▓▓▓▓▓▓▓▓▓▓▓▓▓▓▓▓▓▓▓▓▓ |
| Conceived | in | liberty, | and | dedicated | to | the |
| proposition | that | all | men | are | created | equal. | Now | we | are | engaged | in | a |

(more text here)

FIG. 3

TEXT IMAGE FROM THE IMAGER

CHATTERBOX PLAYER CONCEPT PROTOTYPE

PDA WITH CAMERA ATTACHMENT

FINGERS POINTING TO AN AREA OF INTEREST IN A J-PHONE (CAMERA-PHONE) IMAGE.

BLOCK DIAGRAM, BSPM PROCESSING

BLANK SPACE PATTERNS IN A TEXT IMAGE

Four score and seven years ago,
continent a new nation: conceiv
proposition that all men are crea

*FIG. 11*

GETTYSBURG ADDRESS WITH FILLED CHARACTERS
AND CENTERLINE

*FIG. 12*

GETTYSBURG ADDRESS BLANK SPACE PATTERN
(APPROXIMATELY ONE PIXEL HIGH)

SELECTED WORD PATTERN IMAGES FROM THE
PAGE BLANK SPACE PATTERN
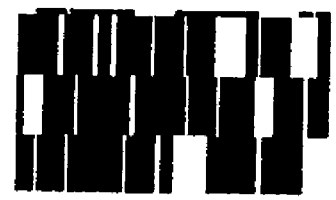
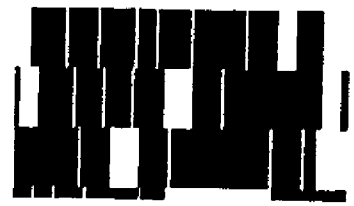
*FIG. 14*

GETTYSBURG ADDRESS WITH BLOCK PLACEHOLDERS

Four■score■and■seven■years■ago■our■fathers■brought■forth■upon■this continent■a■new■nation:■conceived■in■liberty■and■dedicated■to■the proposition■that■all■men■are■created■equal■■Now■we■are■engaged■in■a great■civil■war■■■testing■whether■that■nation■■or■any■nation■so■conceived and■so■dedicated■■■can■long■endure■■We■are■met■on■a■great■battlefield of■that■war■■■We■have■come■to■dedicate■a■portion■of■that■field■as■a■final resting■place■for■those■who■here■gave■their■lives■that■this■nation■might live■■It■is■altogether■fitting■and■proper■that■we■should■do■this■■But■■in a■larger■sense■■we■cannot■dedicate■■■we■cannot■consecrate■■■we■cannot hallow■this■ground■■The■brave■men■■living■and■dead■■■who■struggled■here have■consecrated■it■■far■above■our■poor■power■to■add■or■detract■■The world■will■little■note■■nor■long■remember■■what■we■say■here■■but■it■can never■forget■what■they■did■here■■It■is■for■us■the■living■■rather■■to■be dedicated■here■to■the■unfinished■work■which■they■who■fought■here■have thus■far■so■nobly■advanced■■It■is■rather■for■us■to■be■here■dedicated■to the■great■task■remaining■before■us■■that■from■these■honored■dead■we■take increased■devotion■to■that■cause■for■which■they■gave■the■last■full measure■of■devotion■■■that■we■here■highly■resolve■that■these■dead■shall not■have■died■in■vain■■■that■this■nation■■under■God■■shall■have■a■new birth■of■freedom■■■and■that■government■of■the■people■■■by■the■people for■the■people■■■shall■not■perish■from■this■earth■

*FIG. 15*

GETTYSBURG ADDRESS WORD SPACE PATTERN

POSITION FINDING USING OCR

OCCURRENCE 2

OCCURRENCE 1

Four score and seven years ago, our fathers brought forth upon this continent a new nation: conceived in liberty, and dedicated to the proposition that all men are created equal. Now we are engaged in a great civil war... testing whether that nation, or any nation so conceived and so dedicated, can long endure. We are met on a great battlefield c that war. We have come to dedicate a portion of that field as a final resting place for those who here gave their lives that this nation might live. It is altogether fitting and proper that we should do this. But, in a larger sense, we cannot dedicate...we cannot consecrate...we cannot hallow this ground. The brave men, living and dead, who struggled her have consecrated it, far above our poor power to add or detract. The world will little note, nor long remember, what we say here, but it can never forget what they did here. It is for us the living, rather, to be dedicated here to the unfinished work which they who fought here hav thus far so nobly advanced. It is rather for us to be here dedicated to th great task remaining before us...that from these honored dead we take increased devotion to that cause for which they gave the last full measure of devotion that we here highly resolve that these dead shall not have died in vain that this nation, under God, shall have a new birth of freedom and that government of the people...by the people.. for the people...shall not perish from this earth.

OCCURRENCE 4

OCCURRENCE 4

| Word | Occurrence | Predecessor | Successor | Above | Below |
|---|---|---|---|---|---|
| dedicated | 1 | and | to | brought forth upon | we are engaged |
|  | 2 | so | ... | civil war... | war we have |
|  | 3 | (line start) | here | never forget | thus far so |
|  | 4 | here | to | fought here | honored dead we |

*FIG. 17*

MAGAZINE PAGE ILLUSTRATING DIFFERENTIATION BASED ON BLURRED
GRAPHICS WITH A PENCIL POINTER

MAGAZINE PAGE WITH EDGES DETECTED

ORIGINAL PAGE OF PUBLICATION

GROSS OUTLINE FOR TWO DIFFERENT PAGES

CONTOUR OF A COLOR STICK FIGURE,
WITH INTERSECTING LINES OVERLAID
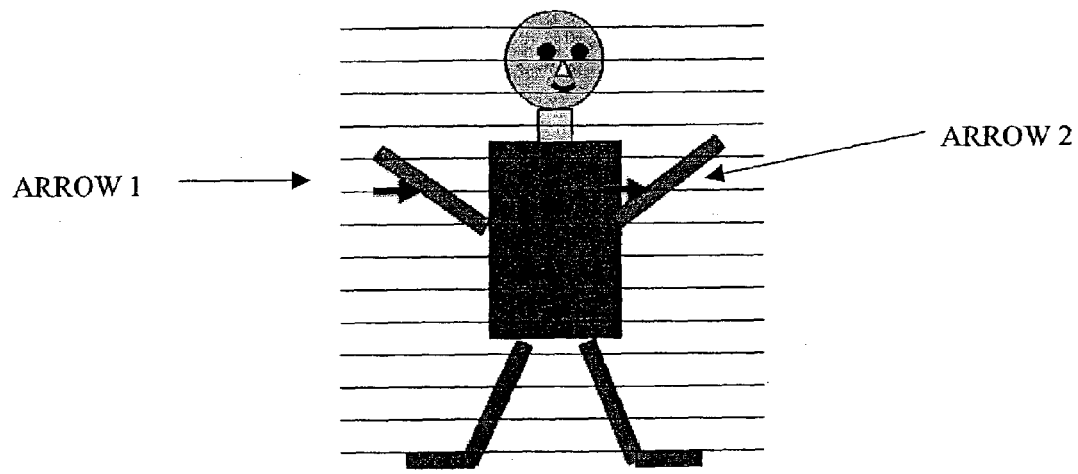
ARROW 1 →   ← ARROW 2
COARSE INTERSECTION OF THE STICK FIGURE
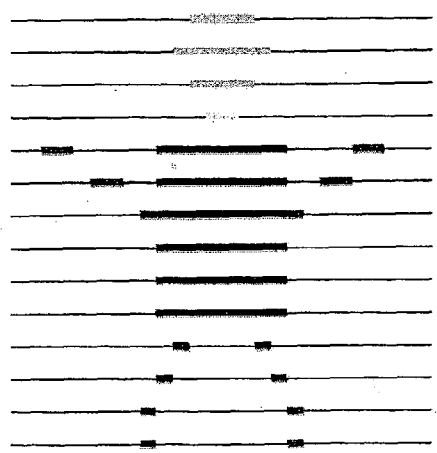
*FIG. 24*

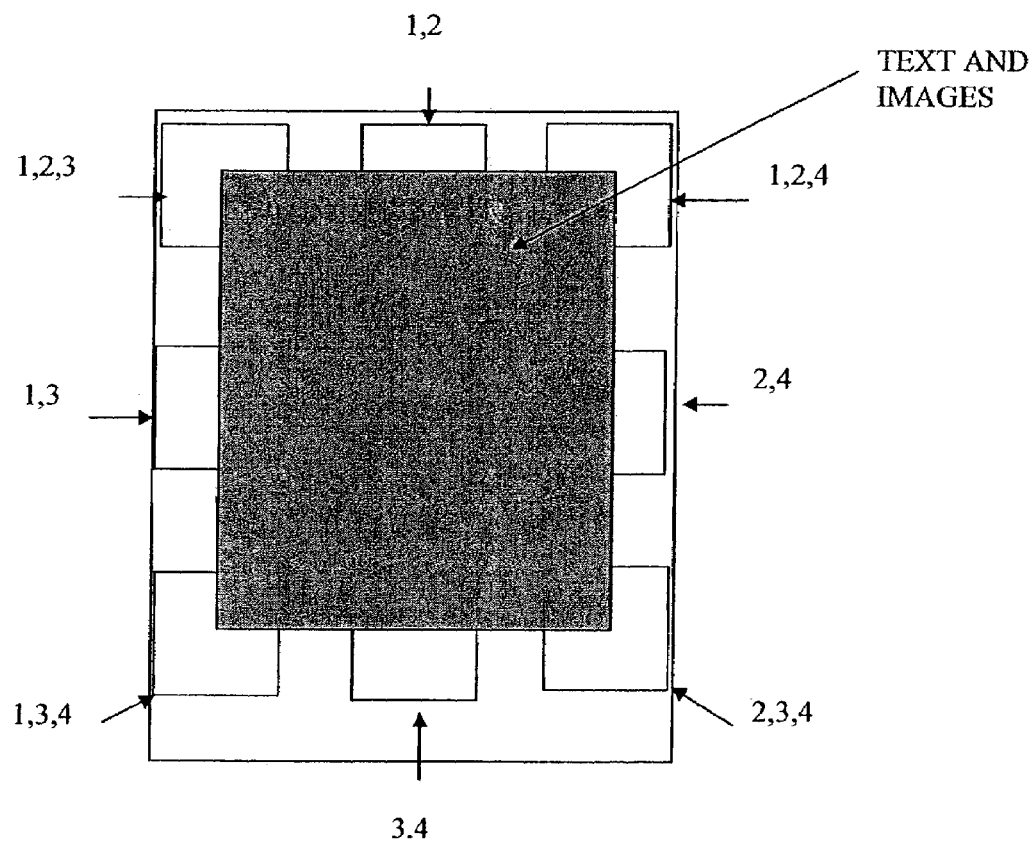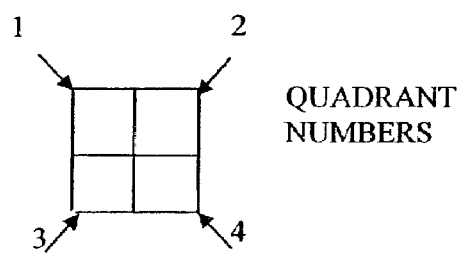
FIG. 25

METHOD AND SYSTEM FOR LOCATING POSITION IN PRINTED TEXTS AND DELIVERING MULTIMEDIA INFORMATION

CROSS REFERENCE TO RELATED APPLICATIONS

This application claims priority from commonly owned U.S. Provisional Application for Patent Ser. No. 60/351,456, "Method and System for Locating Characters or Words in Printed Text and Delivering Multimedia Information" filed Jan. 24, 2002, and commonly owned U.S. Provisional Application for Patent Ser. No. 60/368,371, "Method and System for Locating Position in Printed Publications with High Graphic Variability" filed on Mar. 28, 2002, both of which are incorporated herein in their entirety by reference.

FIELD OF THE INVENTION

The present invention relates generally to a system for processing printed publications and triggering actions from specific locations in these publications, and in particular to determining these locations from the content of the publication rather than from inserted symbols or underlying tablet hardware.

BACKGROUND OF THE INVENTION

Conventional devices and techniques for pointing at positions on a two-dimensional surface have been used as a means of inputting information since the earliest days of computers. On-screen techniques include a light pen that senses the light output of a CRT during an X-Y scan. Systems allowing users to select a position in a printed publication have generally taken two forms: tablet-based systems and on-page iconography of many different types.

Tablet-based Systems

In tablet-based systems, a pressure sensitive surface is often used to detect stylus position. This X-Y position information is then used directly by the system or conveyed to an attached computer as input for a program.

Alternatively, various approaches keying on radio signal can be used to fix position. Recently such position-finding techniques have been used to make a direct connection between printed text and audible speech in an instructional apparatus used to teach phonics and other elementary subjects. In the LEAPPAD (LeapFrog Enterprises, Inc.)learning device a simple, low-resolution stylus pointing device is used to access a stored database provided on a cartridge that is sold with each printed book. Pointing at symbols or words provides an easy, intuitive mechanism for generating pointers to sound segments that are stored in the associated cartridge.

Both pressure-sensitive systems and the LEAPPAD rely on underlying tablets which when deployed must necessarily measure at least as large as the largest usable print publication in which it is desired to fix position. Additionally, both pressure-sensitive and radio-based units such as the LEAPPAD device require special on-page navigational symbols or features to distinguish one two-page spread (a "gatefold") from another. Moreover, neither can be used with conventionally bound publications. In the case of pressure sensitive systems, this is due to the difficulty of determining exactly what spot in a publication the user is pressing when that publication is many pages thick. In the case of the LEAPPAD or other radio-based systems, without spiral or other special bindings the "registration" of the system is thrown off. This is due to shifting in the surface of pages in the beginning, middle and end of a book relative to any underlying base.

On-Page Based Systems

Other techniques for locating a position on a printed page rely on embedding bar codes, icons, swirl patterns, glyphs, watermarks (such as those in pictures) or other machine-readable information in the page. Once the page or a portion thereof has been converted to a computer image, a computing device can then decode the bar code or icon, fix position based on a unique swirl pattern, decode information contained in a glyph or watermark, etc. This information can then be used to navigate to a web address, as in "print-to-web" or "print-to-Internet" integration, or for other purposes.

It would be useful to provide position finding methods and devices that do not require a tablet or custom, embedded information, thereby eliminating the requirement for cumbersome equipment or special publications, and enabling the application of these techniques to the entire body of existing (and future) publications.

Objects and Advantages

Accordingly, the present invention has the following objects and advantages, among others:

1) To provide an inexpensive means for locating position in a printed text depending only on imager information detected by a pointing device, phone including a digital camera, or a PDA including a digital camera or other image detection system without relying on a separate physical apparatus such as an underlying tablet;
2) To locate this position depending only on imager information detected by a pointing device, phone including a digital camera, or a PDA including a digital camera or other image detection system without requiring changes to the printed page, such as bar codes, icons, "swirl patterns", glyphs, watermarks, etc.;
3) To provide higher resolution pointing than is possible with stylus or tablet devices operating on thick, bound publications;
4) To implement such word location without the use of Optical Character Recognition (OCR)systems and their associated errors, computational burden, font constraints and proprietary restrictions;
5) To provide means and methods for such word location that can operate with a variety of alphabets comprising, for example, Greek, Russian, Hebrew and Arabic characters;
6) To provide position finding software that is designed to work closely with a file or files developed by an accompanying authoring system which determines the content to be served or action to be taken depending on a user's desired position in a given printed text;
7) To convey this positional information to a related system (whether local or remote) that can respond to a reader with context-appropriate actions or information, and upon determining the user's position in a printed work, deliver context-sensitive audio or other information (in the original language or in translation, of any arbitrary length), initiate a program that would run a game or vocabulary drill, etc.; and
8) To provide position finding software that can run locally (on a device with relatively little computational power) as well as on a server.

SUMMARY OF THE INVENTION

The present invention offers these and other benefits by providing methods and systems for locating selected points on a printed page and linking such locations to various activities or sources of supplemental information. In one embodiment, a system according to the invention includes:

1) An authoring component that processes printed publications for use with the system and matches positions in the printed publication with specific actions (such as delivering multimedia content or conveying a user to a predetermined URL);
2) An end-user device with an imager;
3) A method enabling end-users to point with a built-in aiming mechanism; stylus, pen, finger or printed arrow or otherwise indicate the region of interest in a printed publication;
4) A series of image processing routines that match the image of the page or image of the region of the page against the images already processed by the authoring component;
5) An accompanying series of image processing routines that determine where in the image the user is pointing; and
6) A method for triggering the actions specified for that region of the print text in the authoring process.

Chatterbox System

In one aspect, the invention comprises methods, systems and devices for providing integrated audio overlays for print media, one such system being referred to herein as the "Chatterbox System". The system enables a human reader to obtain audio information to accompany his or her reading of a text. For example, a reader of a foreign language text would be able to receive an audio pronunciation of words or phrases; a child would be able to receive a spoken-language version of words, or hear the sound an animal makes.

Chatterbox Authoring System

In another aspect, the invention includes methods, systems and devices for generating and integrating the audio (or other) information so that it can be accessed, retrieved, and/or delivered by the systems and devices described here. In one practice of the invention, having a human reader read the text aloud into a storage system can create a soundtrack. The soundtrack can then be broken out by paragraph, sentence or line, word, etc. as desired, indexed, associated with places in a given publication and stored. The appropriate stored audio information can later be retrieved and delivered when a user of the Playback system selects its corresponding location.

Chatterbox Player

The system can include a pointing element (which may be, in one embodiment, a mouse-like optical reader), an imager, a processor, a source of audio or other information, and a headphone or other means for delivering audio information. The human reader points the pointing device at a position of interest on the page (e.g., a word or phrase); then the processor (1) receives signals from the imager; (2) executes a position-finding routine to determine the position of interest, (3) obtains and delivers audio or other information associated with the position of interest (such information may either be pre-stored or retrieved on the fly); and then the audio information is played for the reader via the headphone. In another aspect, audio content is downloaded from a web-connected PC (or PDA, handheld appliance, Web-enabled telephone, CD ROM, processor, or any other form of digital storage media.)

Thus, users can point anywhere on a page's text, then direct the system to "read" or "translate" this word, sentence, chapter or book. As described below, the system will also support two or more different soundtracks (for example, in different languages), speech and music, and any printed or spoken language.

Position Finding

In another aspect, the invention comprises methods, systems and devices for determining a position on a page or set of pages. The position may be, for example, a word, sentence or portion of text in a book, magazine, or other collection of text, for which the user would like to obtain audio information or overlays. The techniques of the present invention enable the detection of a user's selected position of interest (and thus the retrieval and delivery of corresponding audio or other information) based on visual, optical or other innate characteristics of the printed page. The system uses the context of a target word, phrase, or other portion of text, or graphic, photo, line drawing, etc., to determine a position, based on the reasonable assumption that for the vast bulk of printed information, placing a word or graphic, etc., in the context of surrounding content enables a unique mechanism of position finding.

BSPM Aligorithm for Position Finding

One practice of the invention includes novel methods (and associated devices and systems) for efficiently determining or finding a position of interest on a printed page or within a set of printed pages. One such method is a blank space pattern matching technique utilizing a hand-held device to capture an image of the portion of interest on the page, determining from the captured image a unique pattern of blank spaces comprising word and character spaces on each of three or four lines, and matching the unique pattern to a database of pre-stored patterns to determine a position on the page (the subject of the 60/351,456 Application).

Using High Graphic Variability to Locate Position

In another practice, the system uses layout, color and other gross graphical features to identify a page within a publication and locate, within that page, the text or graphics at which the user is pointing (the subject of the 60/368,371 Application).

Variations, further detailed techniques for position finding, multimedia information retrieval, user interfaces and other aspects are further discussed below in the Detailed Description of the Invention.

BRIEF DESCRIPTION OF THE DRAWINGS

FIG. 2 illustrates a publication after word breaks have been identified according to the presently disclosed invention.

FIG. 3 illustrates the publication of FIG. 2 with a "hotspot" identified.

FIG. 11 illustrates an example of blank spaces detected by vertical sweeps to form the shaded areas between characters.

FIG. 12 shows the results of filling letters and measuring the distances between characters at the centerline in the Gettysburg Address using a BSPM algorithm.

FIG. 14 shows selected word pattern images from the page Blank Space Pattern.

FIG. 15 illustrates the Gettysburg Address with word spaces (and punctuation) replaced by "block" placeholders.

FIG. 17 shows a method of position finding with OCR and a word adjacency database which can be implemented with the system of FIG. 1.

FIG. 24 shows the contour of a stick figure with intersecting lines and of a coarse intersection of the lines with the stick figure.

FIG. 25 illustrates presorting by mostly-white (or background color) quadrants.

DETAILED DESCRIPTION OF THE INVENTION

Overview

Definitions

As used herein the term "hotspot" refers to an area in a print publication which, when selected by the user, triggers a corresponding action in the system. "Word space" refers to the space between two words in printed text. "Word break" refers to the separation between two words, as is typically indicated in English by a space, slash, dash (except at the end of a line where it may indicate hyphenation), ellipsis, new line or new paragraph, etc. "Sentence break" refers to the boundary between two sentences, as would commonly be signified by a period and one or more spaces, new paragraph, etc. "Paragraph break" refers to the boundary between two paragraphs, as would typically be indicated by a period and a blank line before the next paragraph, and/or an indent in the next paragraph. "Image boundary" refers to a boundary, either as printed or as interpolated, that separates an image from the rest of the publication. "Text granularity" refers to the smallest supported size of a hotspot in text. For example, may users select a character, word, sentence, paragraph, etc. "Authoring system" refers to a series of software routines that, among other functions, pre-process a printed publication to generate a custom index of the contents and tie particular positions in the contents to certain multimedia selections or other electronic activities, and then output this information in a computer-readable file. "Chatterbox" refers to one version of the invention, including an authoring system and user device (and optionally, a server) that taken together allow a user to indicate a point of interest in a print publication and trigger an action. "Collision" refers to the system possibly matching an image from the playback device's content representation with one or more incorrect representations of the publication's stored images, owing to shared characteristics, etc.

Block Diagram

Figure 1:
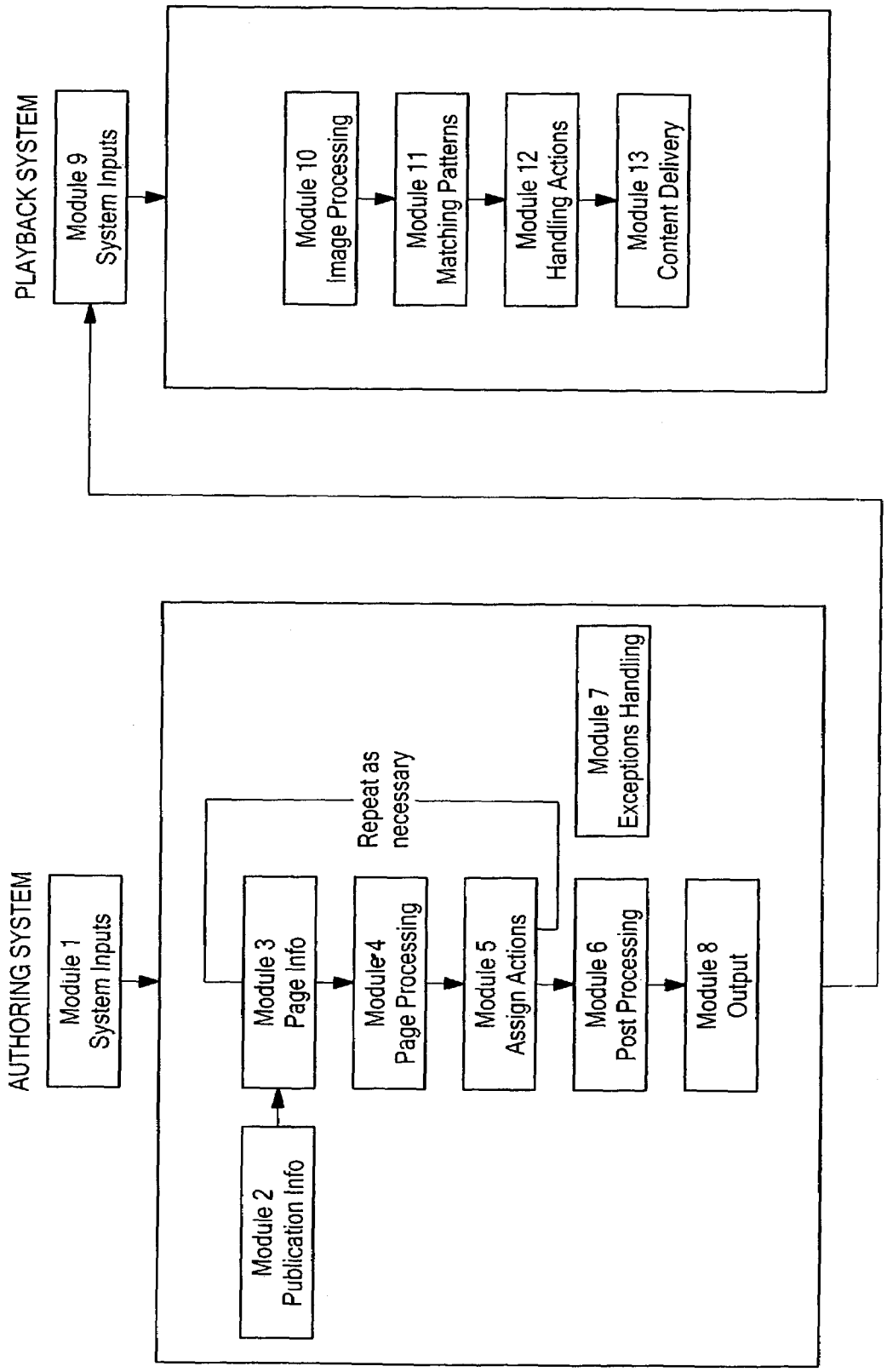
FIG. 1 is a block diagram of a system according to the presently disclosed invention, including the Authoring System and the Playback System.

FIG. 1 presents a block diagram overview of the system and its two main components, the Authoring System and Playback System. In FIG. 1, Module 1, various content inputs are introduced. In FIG. 1, Module 2, an operator adds publication information. In FIG. 1, Module 3, an operator adds information on each page to be processed. In FIG. 1, Module 4, the actual page processing takes place, preparing the print publication for later matching by the playback unit. In FIG. 1, Module 5, an operator assigns actions to accompany each region of the page that could be selected by a user. FIG. 1, Modules 3 through 5 are repeated until there are no pages left to process in the target publication. In FIG. 1, Module 6, a post-processing step analyzes all the patterns generated by all the pages and searches for possible collisions and other anomalies, derives various values of use in searching, etc. In FIG. 1, Module 7, exceptions are displayed to the operator, who may use a subset of the capabilities in FIG. 1, Modules 3 and 4 to specially process these anomalies, repeating as necessary. When the post-processing is complete, the publication is output as a file or series of files that serve as key System Inputs (FIG. 1, Module 9) to the Playback System where they are stored in a library of images. In FIG. 1, Module 10, the Playback System processes an image from an imager to prepare for matching with the publication's stored library of images. In FIG. 1, Module 11, the image from the imager is matched with those in the stored library. In FIG. 1, Module 2, one or more previously defined actions are associated with the user's position in the publication, and in FIG. 1, Module 13, appropriate content, etc. is served up. These block diagrams are discussed in detail below.

Sample Applications

Using the system, users reading a foreign language text would be able to receive an audio pronunciation of words or phrases, and a child would be able to receive a spoken-language version of words, or hear sound effects, etc.

Other applications for the invention include:
1) Primers for English Language Training (ELT) using native speakers;
2) Children's books with standard audio and personalized audio;
3) Instruction manuals for teaching a foreign language;
4) Textbooks with additional oral commentary by the instructor;
5) Birding books using the printed text to access the associated birdcall;
6) Translation of technical journals;
7) Textbooks with inserts of historical audio recordings;
8) Audio inserts in classical theatrical texts; and
9) Music catalogues with performance samples.

Authoring System

Overview

Using the authoring system an operator can tie positions on the printed page to context-sensitive audio, other information, or actions. At playback, based on a user's selection, the invention includes methods, systems and devices allowing the run-time system to provide the appropriate context-sensitive audio or other information, or to trigger the desired actions.

Authoring System Inputs

In FIG. 1, Module 1, various content inputs are introduced. These include scanned images of all pages in the subject publication, any audio or multimedia content the publisher wishes to link to the subject publication, and, optionally, a machine-readable version of the text in the publication. The authoring system will preferably accept a limited number of graphics file formats, such as the well-known bitmap and TIFF formats. Acceptable audio file formats could include AU, WAV and MP3. The operator can also indicate for which playback devices the publication is being authored, since different devices call for different authoring routines.

Publication Information

In FIG. 1, Module 2, an operator adds publication information such as: publication type, (e.g., text only, mixed text and graphics), number of pages, default hotspot granularity in text and graphics, etc. Also, the operator can optionally convey style information such as the number of pages, font size, color and other information related to the placement and type of material on the page.

Page Information

In FIG. 1, Module 3, an operator optionally adds information on each page to be processed, including the page number, chapter if any, whether there are any jumps to other pages aside from the succeeding page, etc. (Page number and jump information is prospectively valuable information at run-time since it is logical to assume readers might follow an article to the succeeding page or follow a jump elsewhere in the publication.)

Page Processing

In FIG. 1, Module 4, pages are processed to prepare the print publication for later matching by the playback device. Publication Information is first accessed to determine the nature of the publication. Text-only materials do not need to be segmented into text and graphics regions.

For materials comprising both text and graphics, the page is first segmented into text and graphics regions, a practice well known in the field of Optical Character Recognition (OCR) software. For example, text sections often have a distinctive alternating patterns of text (often in black, but sometimes other font colors) and background color (often white, but sometimes another color.)

After identifying a text region, the system runs existing software that finds the constituent lines of text. The system next runs a Blank Space Pattern Matching (BSPM) routine or other text processing routine, as described below in detail. As part of the BSPM processing, the system identifies (inter-) word spaces, which are consistently wider than those between characters. In one embodiment, the operator is presented in sequence with each page in the given publication being processed, and the Authoring System's suggested word breaks (FIG. 2). The operator can manually correct the system's suggestions.

The system also runs one or a series of graphics finding routines, ex ed in detail later, to allow for finding position in graphics during playback.

Assign Actions

In FIG. 1, Module 5, the operator defines each hotspot, based on desired text granularity, graphic outlines and other factors. (See FIG. 3.) For instance, users clicking anywhere in a given sentence might be played a pre-recorded rendering of the entire sentence. In another, clicking on a given word would bring up that word alone, not the entire sentence. An entire drawing in one instance could constitute one graphic hotspot, while in other cases, elements of the drawing could each be a hotspot in their own right. The hotspots are next tied to actions.

Actions can also depend on which playback device the user is employing, since output from the authoring system could run on many different devices with a range of different capabilities. For example, some players can convey only a relatively coarse position (for instance, a region of a page) rather than the particular word a user might be interested in. In other cases, some systems might support audio playback, others can also play video selections or other multimedia applications, while still others could support Internet access or trigger a logic sequence in a piece of software. The system accommodates this range of different capabilities and customizes the menu of possible actions that could be triggered for a given type of device from a particular position on the page.

Actions can also depend on the device's state (for example, which soundtrack is selected), any program logic (for example, whether the user clicked in the correct place or not), and so forth. Therefore, the Authoring system keeps a database that includes the hotspots and corresponding actions by device, by program logic, by device state, etc.

FIG. 1, Modules 3 through 5 are repeated until there are no pages left to process in the target publication.

Post Processing

In FIG. 1, Module 6, each page may optionally be broken into smaller patterns centered around each word on the page. (As will be ex ed, this allows the Playback System to search for patterns at the word, rather than the pixel level. There are many fewer words on a given page than horizontal pixels of text. Therefore, this approach can dramatically reduce the number of patterns that must be stored and then used for matching, on the order of roughly 200 to 1.) Further, another post-processing step analyzes the patterns generated by the Authoring System on all the pages. The system can use presorting or binning to accelerate run-time pattern matching. In the course of authoring content files, the system can sort and place individual word or graphics patterns in separate "bins" using various global features. (At run time, this allows the system to eliminate those patterns that are so different from those obtained by the imager that they need not be considered as possible candidates for matching.) This "metadata" on each word or graphics pattern is also captured in a database.

The system also generates a series of style parameters for each publication (font colors and sizes, background colors, etc.) that are later used by the run-time system to help identify a user's position. Additionally, the system searches for possible run-time collisions and other anomalies; see below.

Exceptions Handling

In FIG. 1, Module 7, exceptions are displayed to the operator, who may use a subset of the capabilities in FIG. 1, Modules 3 and 4 to specially process these anomalies, repeating as necessary. (See BSPM AT THE WORD, PHRASE OR SENTENCE LEVEL, below.)

Output

When the post-processing is complete, the publication is output as a file or series of files (FIG. 1, Module 8) These files can include patterns, pattern metadata, multimedia content, actions, etc. in formats suitable for use by a playback system.

The files can also include finding aids in the form of hints and style parameters. By way of background, competing approaches to locating position have no need for hinting or style parameters. In the case of pressure sensitive or radio-based finding, the system unambiguously returns an X-Y position within a certain operating tolerance. In the case of on-page symbols, processing software again returns location information based on information embedded in the symbol. Since the Chatterbox system can find position in an unchanged underlying print text, hinting can be an important mechanism for speeding up the performance of the system.

In a novel embodiment, the authoring system can be used to communicate various style parameters and other elements of the printed text to the run-time software of the playback system. In particular, as part of the authoring sequence, the authoring system can extract salient features of the print work in question. These features become part of the Chatterbox file and are so passed to the run-time system of the playback system. For example, if a magazine has several spreads whose background color is a certain RGB value, when the run-time software encounters an unbroken stretch of that color, it knows with some assurance that that is a page or column margin, end of a line, blank line, etc. from somewhere in these spreads. Similarly, if the authoring system determines that a particular print work has 12 point black body text and 16 point blue headline text (See FIG. 3), that information could also be time-saving input for the run-time image processing routines. The authoring system could acquire this information via operator input, a "style sheet" accompanying an electronic version of a document, through various tests on the document's scanned or bitmap image, or other means. Once complete, a given publication could be divided into one or several Chatterbox files, enabling users to employ the storage capacity of their player most flexibly.

Enhancements

It is possible to identify the start and stop positions of given words in a spoken audio selection using voice recognition "segmentation" software or other software tools that look for breaks between words. To dramatically speed up the authoring process, in a novel process the Chatterbox system could optionally "pre-process" a spoken audio stream using these tools and propose matches with the on-page text, based on word breaks. The operator could then hand correct these proposed matches.

A similar approach could be used to tie written words in one language to their spoken counterpart in a foreign language. In this instance, the foreign language soundtrack is "segmented" while the text is run through a machine translation program. Optionally, a module of the authoring system can automatically suggest vocabulary matches between the printed language and its foreign language equivalent thus eliminating much painstaking hand linking from the text to a foreign language soundtrack.

Playback System

Overview

In one embodiment, the invention comprises methods, systems and devices for providing integrated audio overlays for print media (one such system being referred to herein as the "Chatterbox System.") The Playback System enables a human reader to obtain audio information to accompany his or her reading of a printed page.

Playback System Inputs

FIG. 1, Module 9 depicts the "System Inputs" required by the Playback System. Before a print publication can be enhanced by associating multimedia content or by triggering actions, a file or files from the authoring system describing the publication must be accessible. As described in the Authoring System description, above, this file or files contain hints (also termed herein Style Parameters), the text and/or graphic patterns in the publications, metadata about these patterns, a database associating these patterns with their locations in the publication, an actions database relating the possible actions that can be triggered from any given point in the publication, and multimedia or other content associated with the publication.

These files could be downloaded from the Internet or distributed as a digitally pre-recorded CD ROM, DVD ROM, cartridge or card, etc. This content could be downloaded directly to the player, or users could first stage Chatterbox files on a personal computer, PDA or other base station and then download them (via USB cable, Bluetooth, WiFi connection, or other means) into the Playback System itself. The files could also reside on a server and be accessed on an "as needed" basis. Last, position finding information and content could be located at the bottom of a specially printed page, encoded as a 2D bit code which is imaged and processed by the playback system.

It is also possible that a user could also create their own multimedia content to accompany a publication, as in the example of a parent reading pages of a children's book aloud page by page. The resulting audio files could be assigned to each page of the publication.

The Playback System must also receive a bitmap image (as captured by a CMOS imaging system or other imager) of that portion of the publication of interest to the reader.

Once a given publication is in use, at any given point the Playback System also retains session state information, including last page accessed, soundtrack (or other multimedia choices) currently selected, other user preference settings, etc.

Image Processing

In FIG. 1, Module 10, pages are processed into a representation of the bitmap image that may be matched against stored patterns from the target publication.

Publication Information is first checked to determine the nature of the publication. Text-only materials do not need to be segmented into text and graphics regions.

For materials comprising both text and graphics, the bitmap is first segmented into text and graphics regions, a practice well known in the field of Optical Character Recognition (OCR) software. For example, text sections often have a distinctive alternating patterns of text (typically in black, but sometimes other font colors) and background color (often white, but sometimes other colors.)

After identifying a text region, the system runs software that finds the constituent lines of text, assisted by hint information from the Authoring System. The Playback System can correct for rotation of the image, exploiting the inherent linear character of text. The gaps between the bottom of one text line and the top of the next line are used as landmarks of the kind that are often added to bar codes for this purpose.

The system next runs a Blank Space Pattern Matching (BSPM) routine or other text processing routine, as described below in detail. As part of the BSPM processing, the system identifies (inter-) word spaces, which are consistently wider than those between characters, and can prepare a pattern based on the word boundary most appropriate to the user's selection. The system next generates a set of metadata describing the pattern. See PRESORTING OR BINNING FOR PATTERN MATCH, below, for details.

Similarly, in graphics finding routines the system can detect the edges of graphics, correct for rotation, generate metadata on the graphic, etc.

Matching Patterns

In FIG. 1, Module 11, the Playback System next uses pattern metadata to dramatically reduce the range of possible pattern matches. Again, see PRESORTING OR BINNING FOR PATTERN MATCH, below, for details. The System next uses state information to help order the remaining content, for example, candidate patterns from pages that immediately precede or follow the last page accessed by the users will be tested first. In a well-known operation, these candidates are then compared via a correlation with the section to be matched and the best match selected.

Handling Actions

As indicated in FIG. 1, Module 12, once the Playback System has located the user's position it can consult the appropriate database and trigger an action based on Playback System characteristics (for example, which types of multimedia content are supported), System state (for example, which "soundtrack" is selected), etc.

It is also possible for the system to use stored program logic to determine the action to be triggered (rather than for instance strictly dictating that clicking on point A always plays multimedia selection B.) This feature has many applications, such as testing whether users properly match a native language vocabulary word with its foreign language counterpart, playing various games, etc.

Content Delivery

Next, the Playback System delivers actual content or otherwise institutes the action triggered by the user's selection, for example, conveying the user to a specific location in a World Wide Web site.

Dedicated Device Version (The "Chatterbox Player")

One version of the Playback System uses dedicated hardware to integrate Modules 9 through 12 (in FIG. 1) into one self-contained device. The system can include a pointing element (which may be, in one example, a mouse-like or pen-like optical reader), an imager, a processor, a source of audio information, and a headphone or other means for delivering audio information. The human reader points the pointing device at a position of interest on the page (e.g., either a word or phrase, or a graphical element.) This pointing device could include an arrow, crosshair, short vertical line or other clearly visible fixed reference point to help the reader indicate the place of interest on the page. In the case of a dedicated device, the image of the pointer itself may or may not be superimposed on the image of the page, since the system has a built-in fixed reference point that can unambiguously indicate the user's area of interest.

Figure 4:
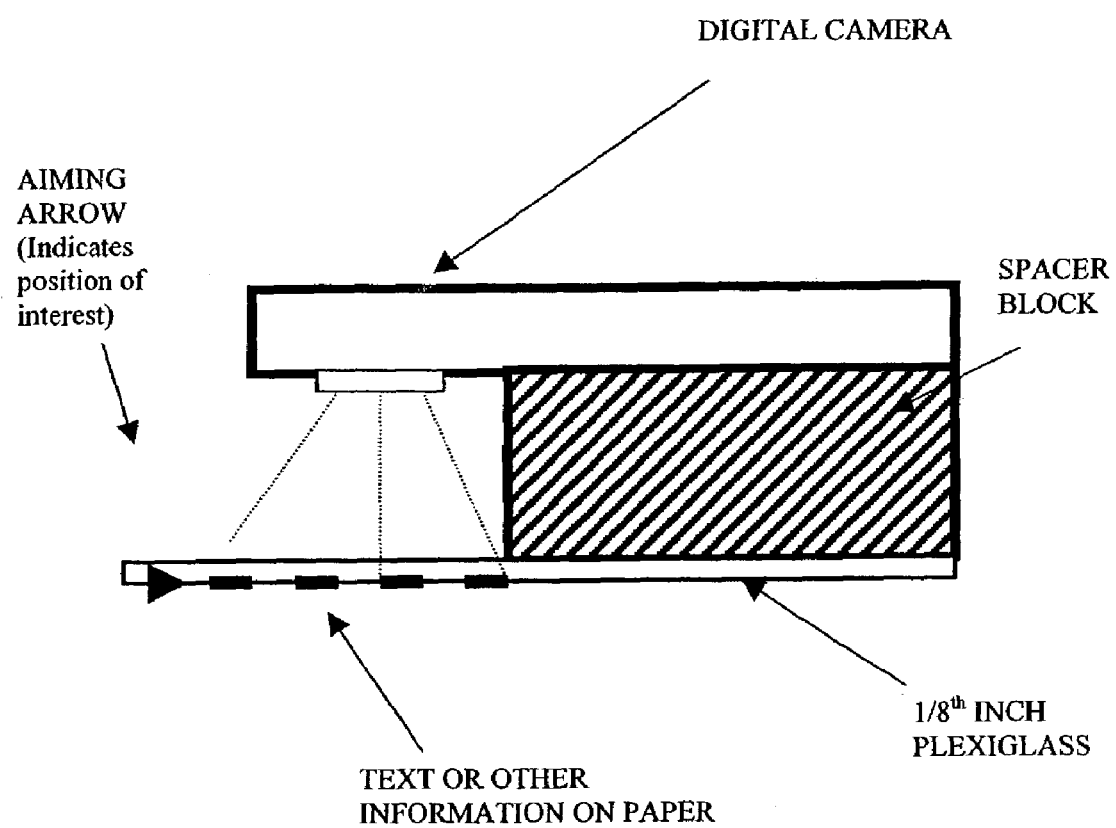
FIG. 4 illustrates an example of a hand-held imager useable in the system of FIG. 1.
Figure 5:
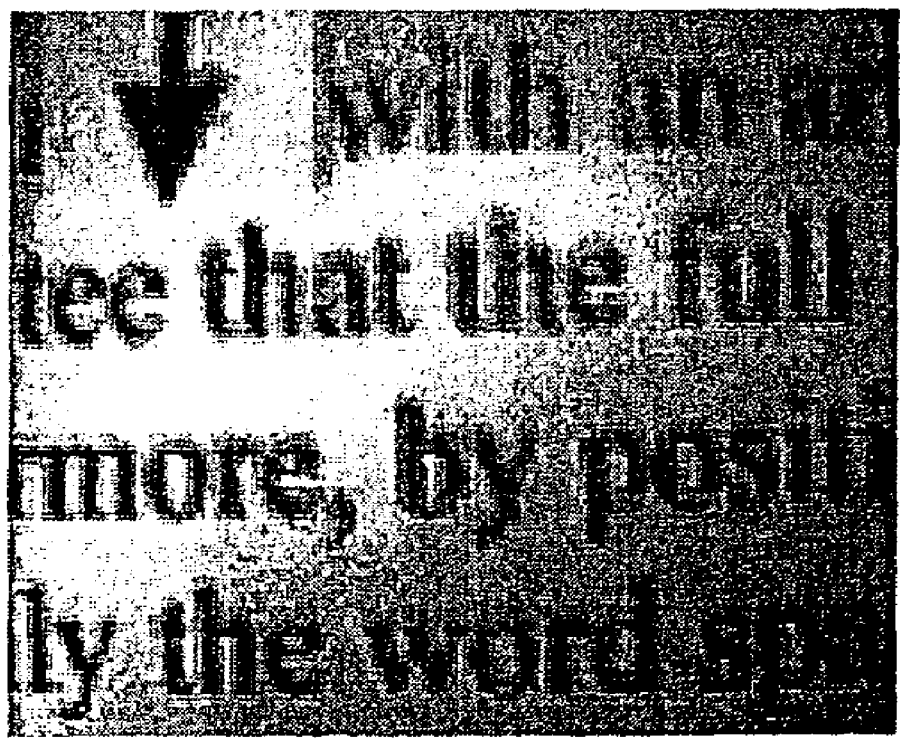
FIG. 5 shows the output bitmap from the imager of FIG. 4 aimed at a word in a page of text.

The imager of FIG. 4 shows one method of accomplishing alignment by having an arrow clearly visible to the user thereby unambiguously pointing at a specific location. FIG. 5 shows an actual image captured by an imager of the type shown in FIG. 4. Here, the arrow points to the word space in front of the word "that" indicating the word "that" is associated with the blank space pattern comprising the white spaces on the three lines below the arrow. The exact convention for positioning the arrow can include pointing to the first letter or the preceding word space as in FIG. 5. Positioning can also be accomplished by use of an arrow pointing to a blank space, to the first character in a word, to any character in a word, to a position in a graphic, etc.

Thus, users could point anywhere on a page, for example, in the text, then direct the system to "read" or "translate" this word, sentence, chapter or book (the latter two options for relatively short material such as children's books.) The Chatterbox Player can be configured to support intuitive CD player-like interactions: repeat, fast forward, rewind, pause, etc. The system will also support two or more different soundtracks (for example, in different languages), speech and music, and any printed or spoken language.

The player could operate with or without separate illumination. In a unique application, the system can use dynamic thresholding to adjust for ambient light, both total light in the room and any shadowing caused by the imager itself.

Figure 6:
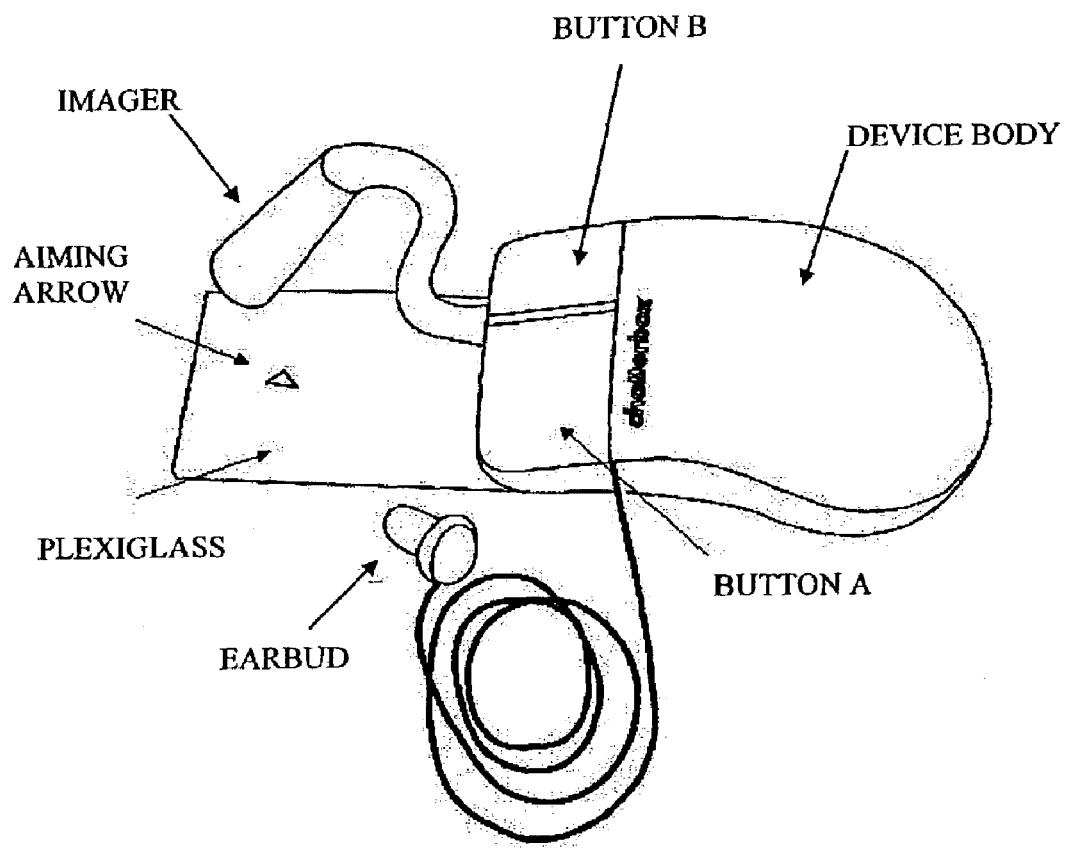
FIG. 6 shows a concept prototype for the dedicated playback system useable in the system of FIG. 1.

In the present invention, the user interface and modes of operation of the system include providing audio information through a speaker, headphone, or earbud as well as means for controlling the system such as pushbuttons. A pushbutton or pushbuttons can be located on the imager to determine whether a word, sentence or paragraph is to be played as well as means for stopping, starting or repeating the word, sentence or paragraph. A "concept prototype" of the player is shown in FIG. 6.

The player can provide the user with audio feedback to help in using various system functions, as well as querying or instructing the user as necessary. An example of a brief query could include, "press once if you are on page 122 or twice if you are on page 123." An instruction could direct-the user to move right or left in a table and snap another image to assist the system in more finely locating their position.

The dedicated player's programmability supports extending its capabilities. For example, a player designed specifically for the educational market could capture bookmarks and information about student's reading patterns and performance. When these users synchronized with their classroom's computer, it could track their performance, offer them a custom web page with links onward to sites of interest, etc. "Reader Service" Player for magazine readers could feed anonymous information about readership patterns to publishers and catalogers in return for targeted promotions and offers. The Reader Service Player could also link to a "My Chatterbox" web site with custom pages for each user allowing easy access to follow-on advertising, editorial information and other links based on their actual reading and expressed interests.

Another Version: Non-Dedicated Device

In addition to dedicated hardware, the invention can also work with an imager-enabled device, either stand-alone or connected via a wireless network to a server. In one embodiment, the system can include an imaging device (which could be a camera-phone or PDA), a wireless network, a server and server-based software. Optionally, the human reader first takes a picture of the cover of the publication he or she wishes to enhance. This bit map image is then conveyed to the server via the wireless network. The server executes a software routine comparing the image of this cover with those currently available in the service and selecting the best match. (See USING HIGH GRAPHIC VARIABILITY FOR POSITION FINDING, below.) Alternatively, the user could key in or speak an identifying number that identified the publication (particularly useful when a periodical has several regional editions or a book has gone through several printings, each sharing the same cover.) Once a publication has been identified, the system need only compare subsequent images with those from that publication, thus greatly reducing retrieval time.

Figure 7:
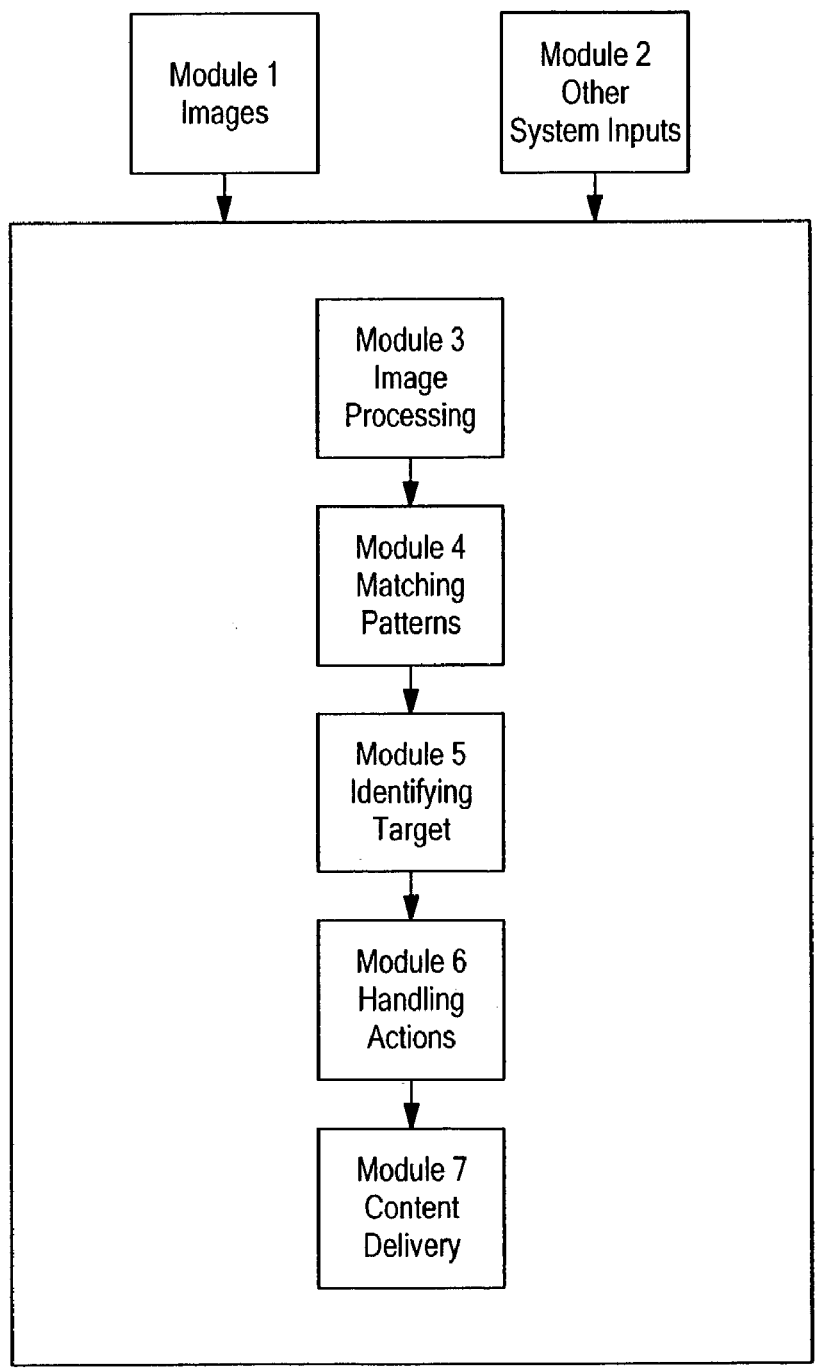
FIG. 7 shows a block diagram of the Playback System, Non-Dedicated Device useable in the system of FIG. 1.

The non-dedicated system can function overall much like the dedicated system, although certain activities may be distributed to a general purpose handheld device, server, etc. As with the Dedicated Playback System, the invention also comprises methods and systems for determining a position on a page. As shown in FIG. 7, "BLOCK DIAGRAM, PLAYBACK SYSTEM, NON-DEDICATED DEVICE", the image inputs from the non-dedicated device (Module 1) are separate from the other system inputs(Module 2). Image Processing, and Matching Patterns operations can take place on a server.

Using server-based position-finding routines that process bitmaps obtained from the pointing device provides virtually limitless processing power, enabling the server-based system to locate in real time the user's position within a very large print work or set of works. By using a relatively small bitmap file, transmission time is kept low and network loading light. The system will work with standard devices, requiring little or no specialty software on the device that does the imaging.

Figure 8:
FIG. 8 shows a PDA with a camera attachment imaging a text selection. useable in the system of FIG. 1.

It is possible for the user to indicate their area of interest in different ways. If the image delivered to the system is (1) of sufficient resolution and (2) comprises a relatively small subset of the page, the image may by itself convey appropriately the user's desired position. FIG. 8 shows a PDA with camera attachment being used to image a block of text for location finding.

Figure 9:
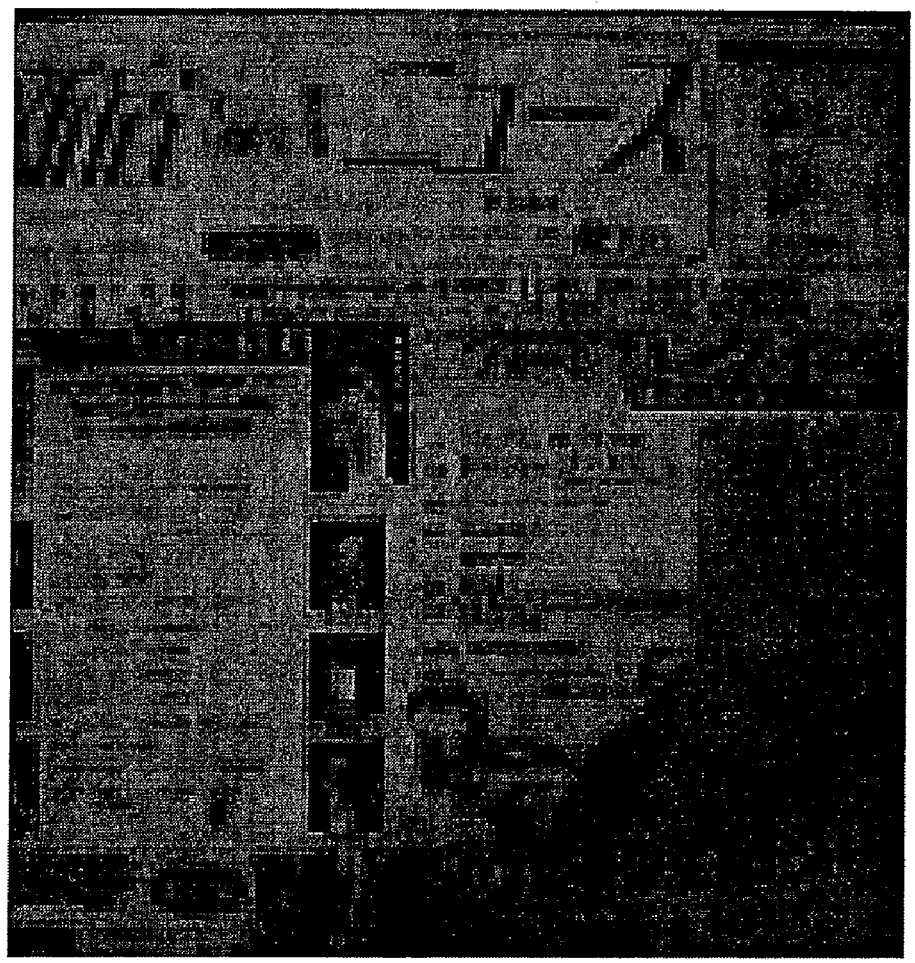
FIG. 9 illustrates an example of a user pointing with fingers to a spot of interest at the bottom of a page in an actual image generated by a J-Phone camera-phone.

If the image delivered is out of focus, or represents most or all of the page, the techniques of the present invention still enable the detection of a selected position of interest (and thus the retrieval and delivery of corresponding audio or other information). The user may indicate the area of interest, either by pointing with a finger (See FIG. 9, "FINGERS POINTING TO AN AREA OF INTEREST IN A J-PHONE [CAMERA-PHONE] IMAGE"), pen, stylus or other pointing device, or placing a paper "POST-IT" (Minnesota Mining and Manufacturing Company) arrow at the point of interest. The system locates the image of the finger, pen, stylus, POST-IT or other pointing device superimposed on the larger image and uses it to coarsely determine the user's area of interest. (See FIG. 7, Module 5) Based on the location and corresponding set of actions (FIG. 7, Module 6) the system then delivers content such as an audio stream (FIG. 7, Module 7). The content could be played from stored local content, or downloaded from the wireless service, a Web page, and so on.

The image of an entire page or region of a page captured by the imager may suffer from one or more deficiencies owing to:

1) Imperfect focus (since the device may have a fixed focal length suited more to distance imaging than close-up imaging);
2) Insufficient resolution to measure word and character spaces or other text features accurately; or
3) A viewing position other than directly above the text (resulting in a skewed image).

Nevertheless, the system can still identify the location of the pointing device and its location in the page in question. Some of the techniques that can be used either singly or in combination are listed in the "Blank Space Pattern Matching" discussion below, as well as in "Using High Graphic Variability For Position Finding", below.

Other Exemplary Configurations

The foregoing discussion presented two exemplary versions of the system: (1) an integrated device which takes the image, processes it, matches the processed image against a stored representation of the publication or publications and plays multimedia or other content or triggers an action based on the location; and (2) a device that includes an imager (either built in or optionally) whose primary use is not interacting with and enhancing printed texts. In the latter case, the bulk of the image processing is off-loaded to a server, and the content streamed to the device after determining what content the user desired.

There are many other possible configurations of the system, some presented in the table below:

| OTHER EXEMPLARY CONFIGURATIONS OF THE INVENTION | | |
| --- | --- | --- |
| IMAGER | Built in | |
| IMAGER | Added as an accessory | Untethered |
| IMAGER | Added as an accessory | Tethered |
| CONTENT | Pre-staged on device | |
| CONTENT | Downloaded on demand | Local host or server |
| CONTENT | Downloaded on demand | Remote host or server |
| IMAGE PROCESSING AND/OR POSITION FINDING ROUTINES | Handled locally | |
| IMAGE PROCESSING AND/OR POSITION FINDING ROUTINES | Handled remotely | |

Position Finding Methods

Overview

Competing systems for locating position typically have only one way to fix position and therefore have no need to select among several different such methods. In the case of pressure sensitive or radio-based finding, the system unambiguously returns an X-Y position within a certain operating tolerance. In the case of on-page symbols, processing software again returns location information based on information embedded in the symbol. Since the Chatterbox system can find position in an unchanged underlying print text, the system uses any number of different position finding methods, depending on the device and the nature of the printed content being used.

As noted elsewhere, the authoring system can communicate various style parameters to the run-time software, enhancing the speed of determining user locations.

Blank Space Pattern Matching (BSPM)

Figure 10:
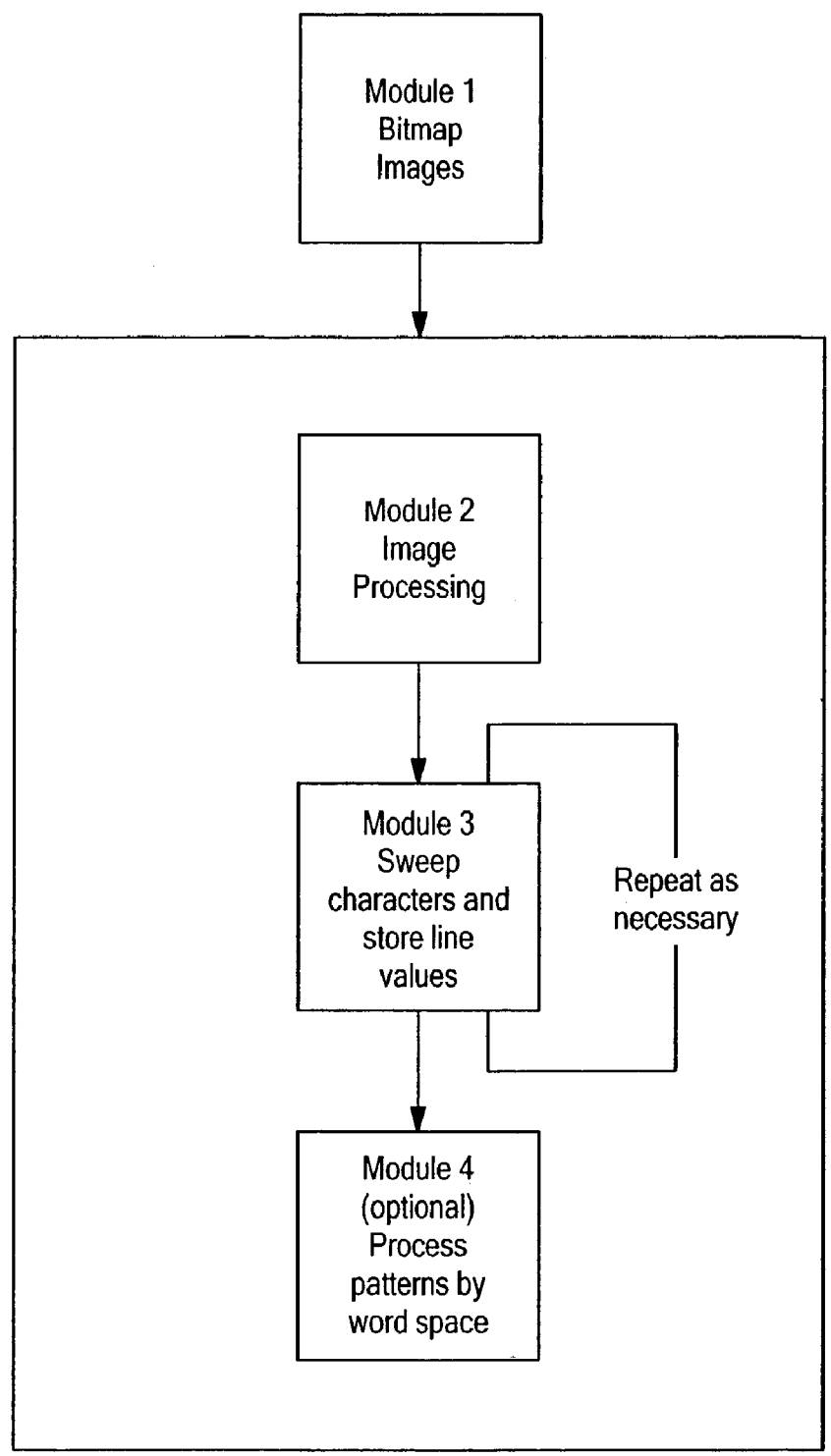
FIG. 10 is a Blank Space Pattern Matching (BSPM) block diagram.

One novel aspect of the present invention, shown in FIG. 10, BSPM PROCESSING BLOCK DIAGRAM and in detail in FIGS. 11-16, relates to a method of using local image information for locating a position in a page of text or group of pages of text, without the use of computer-intensive character recognition software. First, an image of the page's text is captured for processing by the Authoring System. Next a unique pattern of blank spaces comprising word and/or character spaces is generated from the image.

One version is illustrated in FIG. 11, "BLANK SPACE PATTERNS IN A TEXT IMAGE" using text lines that have been expanded for clarity. The gray stripes represent the result of vertical scans uninterrupted by black print. In order to produce a unique pattern with a minimum of processing, the shortest horizontal spaces between characters are measured. In this embodiment, for each line, the minimum distance between the right-most irregular edge of character n and the left-most irregular edge of character n+1 is measured and stored.

Figure 12:
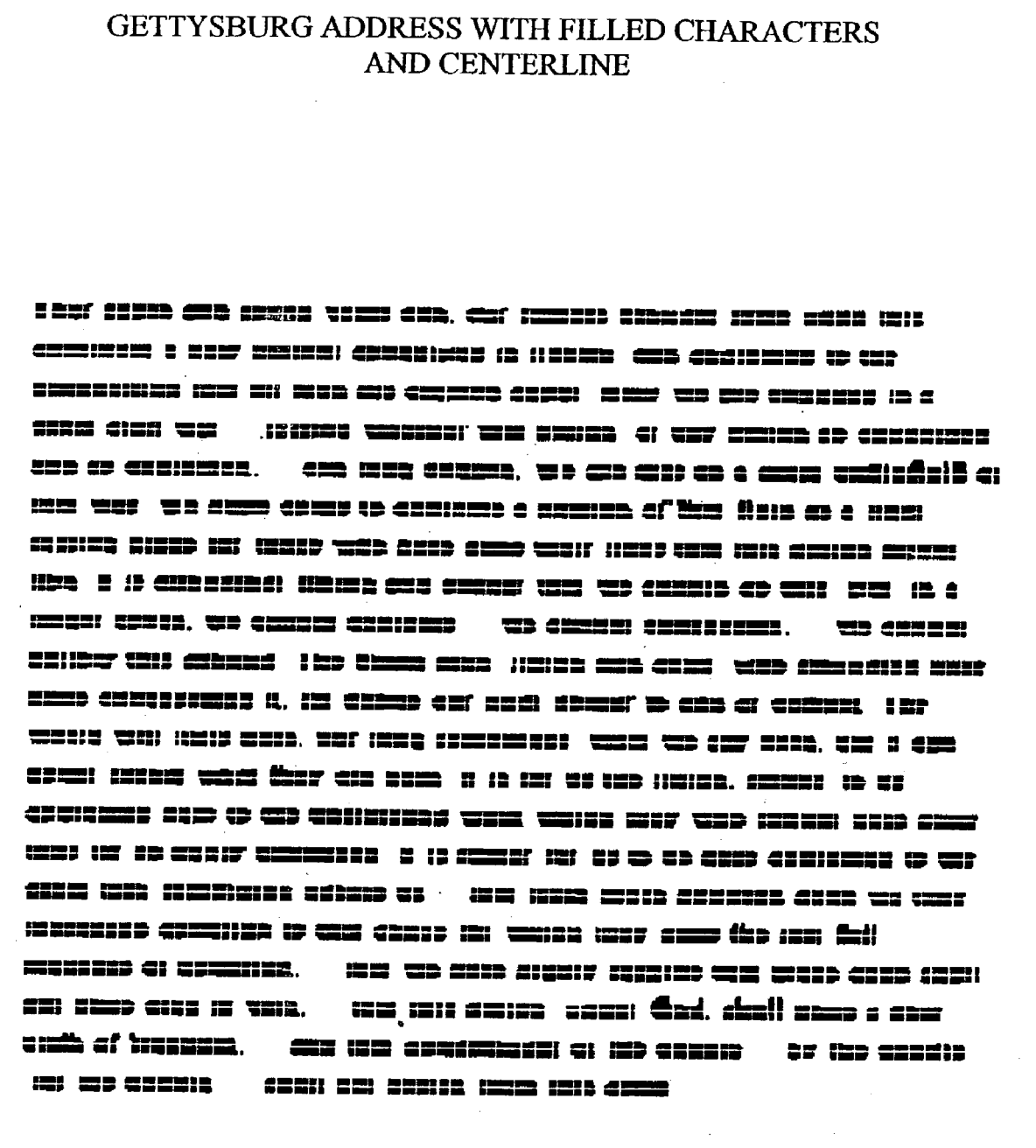
Figure 13A:
FIGS. 13a and 13b show the Blank Space Pattern for the Gettysburg Address and shows the same Blank Space Pattern, enhanced for visibility.
Figure 13B:
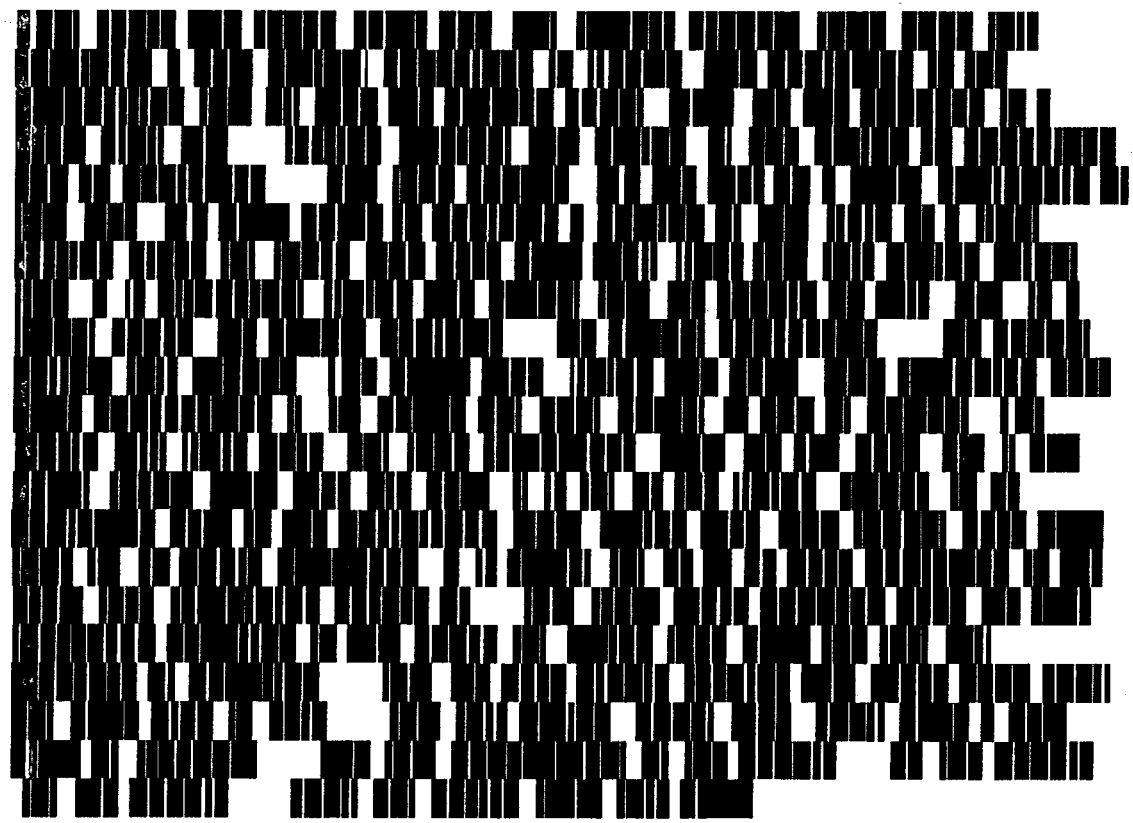

FIG. 12 shows an actual example, using the Gettysburg address. In this version, the blank spaces were generated by first using a morphology operator, said morphology operator filling in each of the characters in black. The software next sweeps a one pixel high line through the center of the first line of the image, recording where it encounters white space. (Alternatively, multiple lines may be swept through the characters rather than a single one through the center.) The next line is then processed, until the bottom of the page is reached. FIG. 13a shows the resulting Blank Space Pattern for the text with each line just one pixel high the page is compressed. The same pattern is shown in FIG. 13b; with the Blank Space Pattern expanded vertically for easier visibility.

The basic algorithm, as described herein, is computationally simple. It is applicable to any font and can be applied to a variety of alphabets with little modification because it does not involve actually recognizing characters but only collecting patterns of blank spaces. Because of the variable spaces and widths of printed characters, the pattern representing each page generates a unique array.

For many applications, locating a word is all that is required for accessing appropriate audio or other information. Each entire page's pattern may therefore be further processed into a set of smaller images represented by patterns surrounding each word on the page. Because of the irregular spacing between different characters and the different lengths and positions of words, the probability of duplicate patterns is negligible. See FIG. 14, "SELECTED WORD PATTERN IMAGES FROM THE PAGE BLANK SPACE PATTERN", for three examples.

During playback, in one embodiment an image of the target portion of the page's text is captured, roughly three or four lines high and approximately a dozen characters per line. As above, a unique pattern of blank spaces comprising word and character spaces is next generated from the image. Furthermore, the algorithm easily corrects for rotation of the imager, using the gaps between the bottom of one text line and the top of the next line as landmarks of the kind that are often added to bar codes for this purpose. Moreover, the algorithm can be applied to Chinese, Japanese and other alphabets and characters read top to bottom. In this particular embodiment, gaps run vertically rather than horizontally, but still provide landmarks suitable for the present invention.

For each point on a page there will then be a unique pattern of blank spaces comprising word and character spaces on each of three or four lines surrounding that point. In order to limit the number of pattern matches required for location, it is possible to store only a subset of those patterns, keying on the word spaces in the Blank Space Pattern. In one example, the desired pattern could start at the first word space on the line selected by the user. In another, the desired pattern could end at the last word space on the line selected by the user, etc. In all cases, even if matching at the word level, it is possible to use stored offset information to nevertheless fix the user's actual position very exactly, for cases where it may be important to address a smaller unit of selection than a word.

Last, these imaged and processed patterns are uniquely matched against a library of the publication's pre-stored patterns to determine the appropriate position on the desired page. In the case of accessing information at the word level, a page comprising approximately 40 lines, each line comprising approximately 10 words per line, may be reduced to only 400 patterns per page. As described below, pattern metadata may also be used to dramatically reduce the candidates for matching.

BSPM at the Word, Phrase or Sentence Level

The 60/351,456 application discloses "finding a word in the context of surrounding words enables a unique mechanism of position finding." While this is certainly true, it is also possible in many cases to use BSPM at the word, sentence fragment or sentence level. For example, the 60/351,456 Application also discloses using the BSPM method to determine the page number from the text, thereby providing a technique for determining words that are not in context, such as a page number that stands alone. This could be useful in children's books, advertisements or other places where small text elements stand alone, rather than in a body of text.

The techniques envisioned by this method include determining position based on a single word, a phrase or a stand-alone sentence. Examples include:
1) Varying BSPM to run multiple line "slices" (instead of one center line "slice") through a word, sentence fragment or stand-alone sentence in cases where the system is trying to locate short text strings;
2) Performing BSPM on characters without first filling them in; and
3) Adjusting the height of the scan-line upward from one pixel, as required.

These same techniques can also reduce the chances of a "collision" if a pattern or word pattern in a publication has characteristics very close to another. Should the Authoring System encounter potential collisions when processing publications, it could allow the operator to adjust any combination of these same or additional parameters, thereby reducing the number of collisions.

In the rare case where collisions are unavoidable (for instance, tables or other materials where large blocks of material are repeated word for word and with the same lay-out) the system can use audio prompting to help the user identify the position of interest (see AUDIO FEEDBACK, above.)

BSPM with Word Spaces Only

Figure 16:
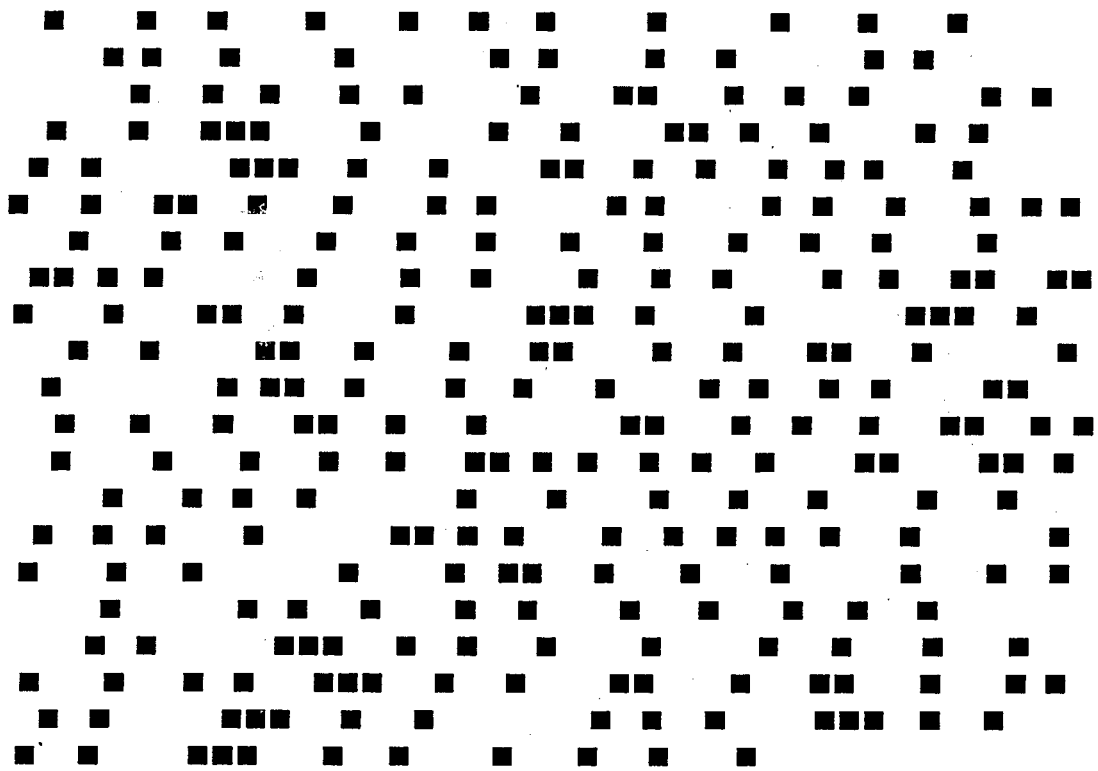
FIG. 16 illustrates the pattern generated by the Gettysburg Address word spaces alone.

For many text materials, it may be sufficient to run BSPM on word spaces alone or word spaces combined with end-of-paragraph and inter-paragraph blank spaces, rather than also processing intra-word (character-by-character) spaces. FIG. 15 illustrates the Gettysburg Address with word spaces (and punctuation) replaced by "block" placeholders. FIG. 16 illustrates the pattern generated by the Gettysburg Address word spaces alone. Taken together, they demonstrate how the Gettysburg Address word spaces generate an extremely detailed "signature", likely unique for all intents and purposes. This approach has the potential to yield much faster run-time performance.

BSPM While Correcting for Imaging at Different Heights, Angles, ETC:

In this novel embodiment, the BSPM is used for correcting imaging at different heights, angles, etc. In a dedicated end-user device, the unit has a fixed focal length and orientation. Many other devices, such as PDAs and cell phones, may incorporate imagers in the future. In these cases the device could be at many different heights and angles from the print page being imaged. The devices themselves may also have different focal lengths, resolutions, etc. In many such cases it may prove more successful to use the techniques described in USING HIGH GRAPHIC VARIABILITY FOR POSITION FINDING, below. Alternatively, it may still be possible to use the BSPM technique. Most books and many magazines have a "standard" body text font with a standard height. Knowing with certainty in advance the font and font height (owing to the publication's style parameters), it should be possible to take the following approach:

1) Trim the ascenders and descenders as at present;
2) Use the space between the resulting "lines" to correct for rotation;
3) Measure the height of the bars (or white space) and expand or contract the image to adjust for camera focal length, distance from the text when imaged, etc.; and
4) Run BSPM on the corrected image, particularly if intending to use word space BSPM only.

Other Variations on BSPM

It should be apparent that it is equally possible to invert or otherwise vary BSPM while still using substantially the same techniques and yielding substantially the same results. For instance, instead of measuring the blank spaces between characters, it is equally possible to measure the character widths.

Other implementations of the system could capture the morphology or orientation of individual characters on a given page, extracting salient features such as the height of the characters' bounding boxes or other elements, such as fiducial points. As with the current system, these various identifying features could then be matched against a pre-processed image of the same page to determine position.

Using OCR and a Database to Locate Position

The current invention does not rely on OCR techniques to locate position, vastly reducing the complexity of finding position in different alphabets and overall computation time. Still, microprocessor capabilities continue to improve. There could be occasions where using OCR might be a useful augmentation to the other position finding techniques detailed herein.

In this instance, the system could use OCR taken together with a word occurrence and word adjacency database, to find position anywhere in a collection of text. See FIG. 17 for four instances of word "dedicated", distinguished from each other by the words (and letters) surrounding each example, with these adjoining words entered into a database list.

Another method for locating position in text-only portions of a publication would be to image all or most of a sentence and convert the sentence image via Optical Character Recognition routines into a text string. If long enough, this text string could then be located in the print publication with relatively little chance of ambiguity or "collision."

In both cases, owing to the error rate inherent in OCR routines, fuzzy matching logic should be employed, a well understood data processing technique.

Using High Graphic Variability for Position Finding

The system also uses shape and graphics information to uniquely locate position (or to dramatically reduce the number of possible matches for a given image captured by the imager.) Several different techniques may be employed, depending on the device, size of the image compared with the target publication's size and the subject material itself.

Take first the case of a non-dedicated device capturing the image of an entire page or most of a page of mixed text and graphics. The image may suffer from deficiencies owing to:

1) Imperfect focus (since the device may have a fixed focal length suited more to distance imaging than close-up imaging);
2) Insufficient resolution to measure word and character spaces or other details accurately; or
3) A viewing position other than directly above the text (resulting in a skewed image).

Figure 18:
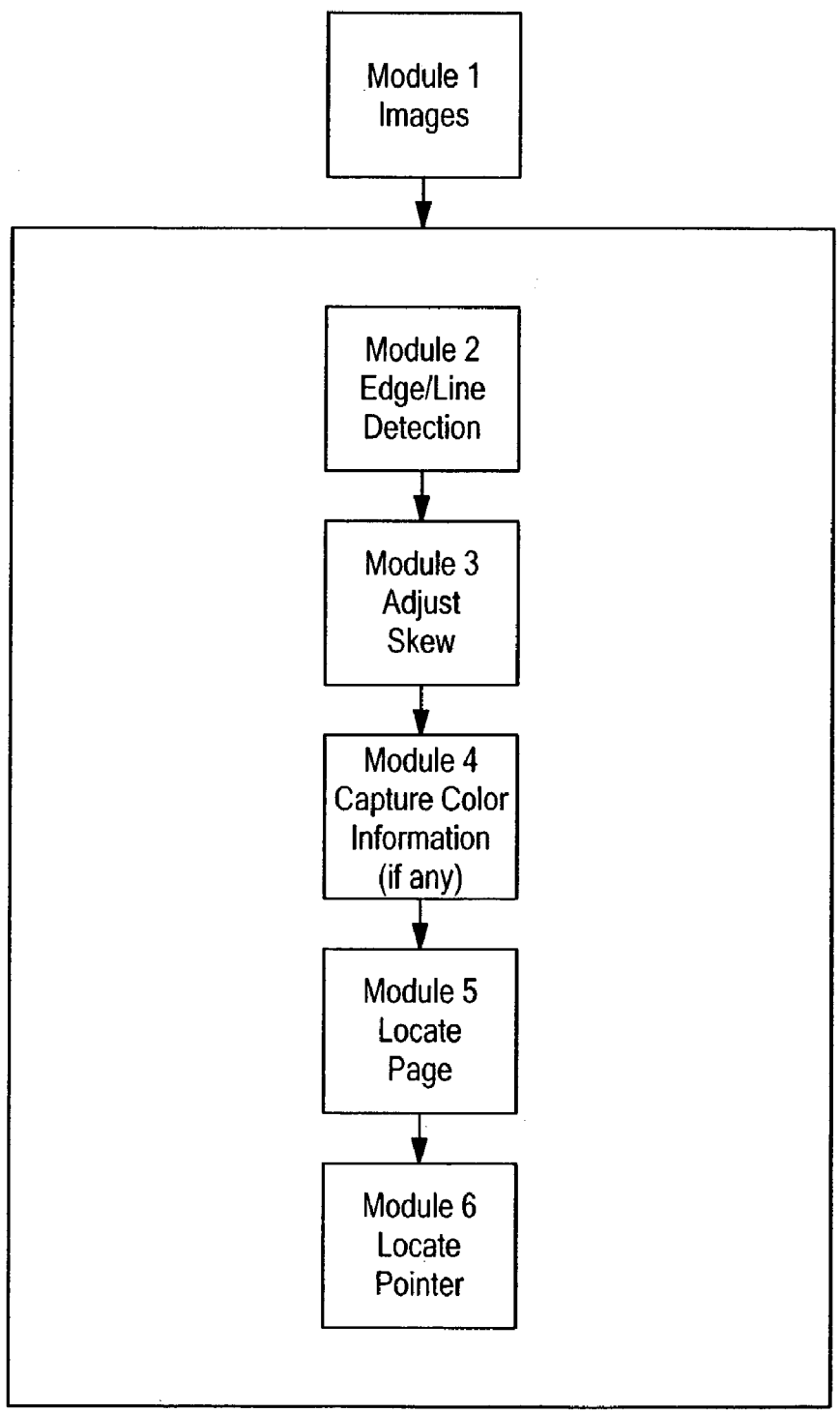
FIG. 18 is a block diagram of a method according to the presently disclosed invention for position finding in text and graphics.
Figure 19:
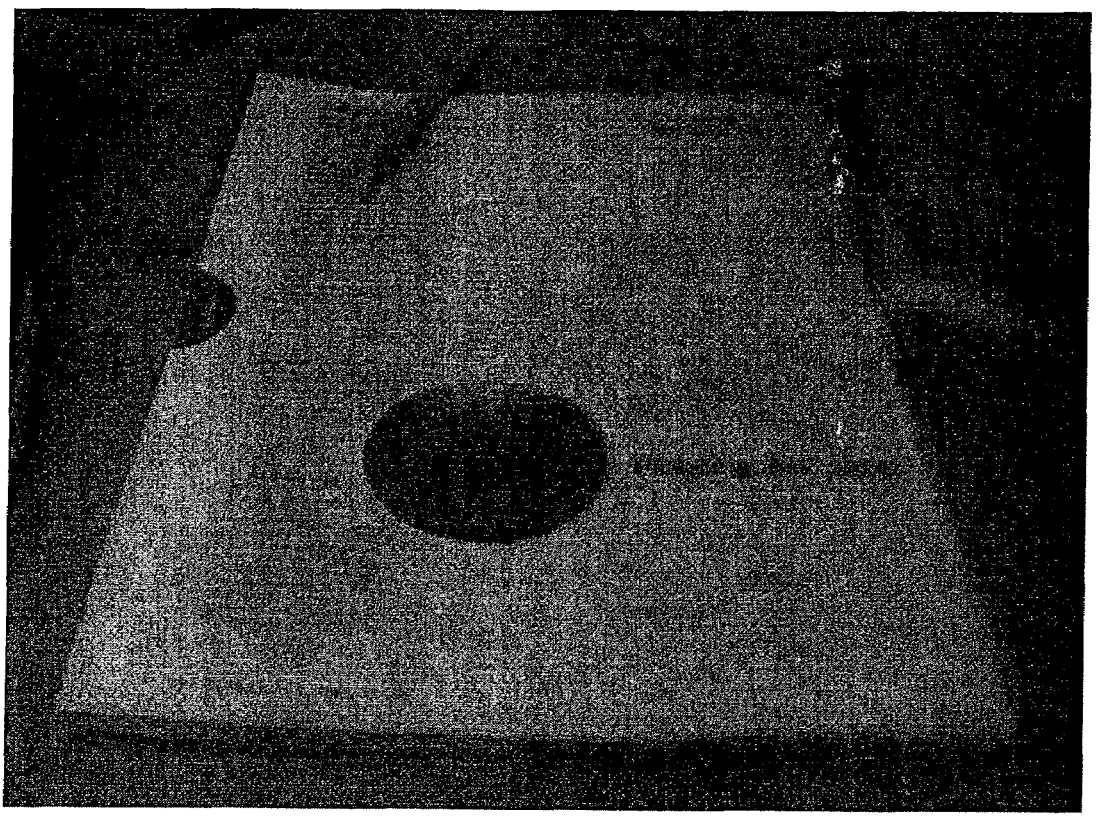
FIG. 19 illustrates a blurred magazine page with a pencil used as a pointing device.

Nevertheless, the system can still identify the page itself as well as the location of a pointing device, e.g., stylus, pencil, finger "POST-IT" or other printed arrow, in the captured image of the page. As shown in FIG. 18, "POSITION FINDING IN TEXT AND GRAPHICS: BLOCK DIAGRAM", in Module 1, the captured image is input. See FIG. 19, "MAGAZINE PAGE ILLUSTRATING DIFFERENTIATION BASED ON BLURRED GRAPHICS WITH A PENCIL POINTER" for a sample image.

Figure 20:
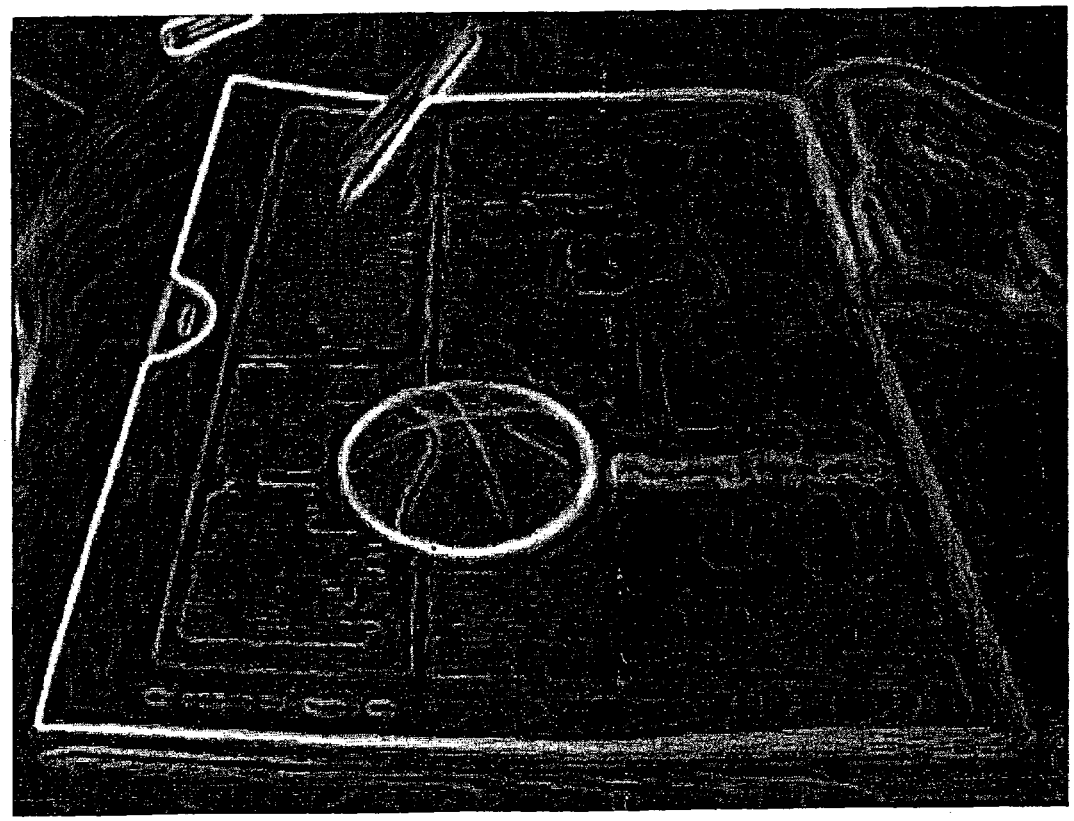
FIG. 20 shows the magazine page of FIG. 19 with edges and pointer detected by the method of FIG. 18.

Among the techniques that can be used either singly or in combination are: (1) Compensating for distortions introduced by angled imaging. The system can locate page edges or, in cases where page edges are not available, employ text headlines as landmarks of the kind often added to bar codes. See FIG. 20, "MAGAZINE PAGE WITH EDGES DETECTED" for an example of a page with edges detected, a common image processing technique. (2) Based on the page edges or headline, the program can next apply a simple geometric correction to adjust for skew. The system captures gross color information in embedded graphics, where available, as another useful discriminant. The shape of the page and stored color information, if any, are next used to match against the images of the publication as processed and stored by the authoring system. Once the correct page has been located, the outline of the pointer, if any, is used to determine the location of interest to the user, and content or actions are served accordingly.

Figure 21:
FIG. 21 illustrates an original, blurred page of a publication.
Figure 22:
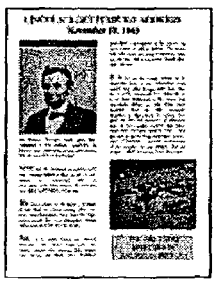
FIG. 22 shows a "thumbnail" version of the page of FIG. 21, indicating how the thumbnail can be used to locate position in the original image by using the method of FIG. 18

In an alternate approach, the user may image the page of the publication of interest, which is passed up to the server. (See FIG. 21.) The server matches the image using the techniques described above, thus identifying the page in question. The server in turn then passes to the user a "thumbnail" of the subject print page on a screen of a display device such as the Chatterbox player, a PDA, a PC, or other playback device and the user then taps a touch sensitive screen or otherwise indicates the element or area of interest to them. (See FIG. 22.) The user could select from a menu of actions at the same time, the menu options being standardized or customized to the content of the page. This information is sent to the server, which can now respond with appropriate multimedia, web or other content.

Figure 23:
FIG. 23 shows the height and outline of two different pages' gross shape, for processing by a system in accordance with the invention.

In cases where the imager captures all or most of a target page of text, it is possible to find and measure the height and outline of the paragraphs on a page as in the paragraph outline approach covered shown in FIG. 23, "GROSS OUTLINE FOR TWO DIFFERENT PAGES." Here, the shaded bars indicate the location and length of the spaces before and following the paragraph endings as well as any other extra line spaces that may occur in the text. Much as with the Blank Space Pattern Matching routine, these page outlines form a distinct signature that may be captured in the authoring system, stored, and matched at run-time against the page image captured by the user.

Turning to the case of a dedicated handheld device, in this instance a smaller percentage of the page is delivered by the imager, but the image will generally be properly focused, very detailed and delivered with a known fixed reference point. In many cases it will be possible to fix position using text-oriented position finding, even if the user is making a selection in a graphics region. See below for one example, where finding position in text in one quadrant definitively fixes a user's position in graphics in another.

In other cases, in order to locate position in graphics the system may use many of the same techniques used for non-dedicated devices, such as a database organized by each page of the publication of the objects contained thereon (as compiled using well-known edge detection techniques), their colors, any background landmarks, etc.

The system may also employ a sampling technique analogous to Blank Space Pattern Matching. Using this technique, images are encoded via a coarse horizontal scan whose vertical resolution is based on the resolution of the objects as opposed to the spacing of text lines. The intercepted horizontal color blocks will produce a pattern that has considerable detail, forming a code block similar to the BSPM code block, with the important addition that color plays a key role and vastly enriches the information content even for coarse figures. Further, the patterns will be unique if the objects appearing on the page are used elsewhere in the larger publication but assume different positions, orientations with respect to text, etc.

It is important to make a distinction between the coarseness of the horizontal scan and the pointing resolution that results from the approach. Since the scan is always centered on the pointing symbol (e.g. arrow, see FIG. 23, Arrows 1 and 2) stored information on the pattern of intercepted color blocks will produce a unique pattern for matching. The system can thus insure it will find the desired object. To illustrate, it is possible to superimpose an aiming arrow at the left hand margin of the picture. (Arrow 1). Moving this arrow around either horizontally or vertically (Arrow 2) will produce a rich, unique pattern that is easily identified by matching against the database for the entire publication. One such pattern is shown in FIG. 23.

Using a Portion of the Bitmap Generated by the Imager

New VGA imaging chips provide an image of 640 by 480 pixels, amounting to 307,200 pixels total. This is over three times as much area as that generated by forerunner Common Interchange Format (CIF) chips that offered 352 by 288 pixels. Whatever the finding method used, the disclosed system can use the additional image size in several different ways to speed processing and location finding.

First, the image can be divided into four quadrants, or regions. Each quadrant, or region, can be quickly tested for, in one example, the percentage of white space in the pattern. (For color material, the system can test for the percentage of background color in the pattern.)

In the stand-alone device the system can then quickly select the pattern showing the most variability and run BSPM or other finding method on this material. Since the system knows the device's fixed reference aiming point, it can correctly place the aiming point's position relative to the located material, irrespective of which quadrant is used for BSPM or other finding method. Information from the other quadrants, such as page edges found, or empty sectors, could further be used to reduce the candidate patterns for matching.

Performance Enhancing Techniques

Presorting or Binning for Pattern Match Acceleration

The system can reduce the pattern-matching load on the run-time software by presorting a publication's patterns using various metrics that allow for partitioning into somewhere between 10 and 100 bins per metric. In the present invention, these partitioning metrics provide simple methods of characterizing the pattern for any sub window that is captured by the imager so that the time to match the pattern will prove acceptable. (There is no practical limitation on the pre-sorting and pre-processing of these patterns during the authoring stage. In the course of authoring content files, the system can sort and place patterns in separate "bins" using various global features.)

At run time, this allows the system to eliminate those patterns that are so different from those obtained by the imager that they need not be considered as possible candidates for matching.

In addition to enabling the system to quickly discard patterns that are bad matches, these metrics should group patterns that are close possible matches, so that subsequent to the coarse binning, an exact and final comparison can be performed.

In one embodiment, applicable to text selections, a simple metric can be the sum all of the blank space widths in any given pattern. In another embodiment of the present invention, a plurality of lines of text, and preferably three or four lines of text, can be weighted differently before summing, thereby providing more variability and more spread of the patterns over a larger number of bins with almost no additional computation capacity required. These examples can reduce the number of patterns to be searched by one to two orders of magnitude versus a total of approximately 200,000 patterns that might result from a 500-page book containing 400 words per page.

Other easily calculated metrics that meet these criteria include:

1) The percentage of white space in the pattern (or, for color material, various different RGB values in the pattern).
2) The length of the line that correspond to the end of a paragraph. In black and white materials, these lines will be white; else they will be the (uninterrupted) background color. These blank spaces are much longer than a word space and easily detectable.
3) The identity of the quadrants in the image that are substantially all-white (or for materials printed on a colored background, the identity of the quadrants in the image that are substantially all the background color are otherwise outside the "active" region of the printed page. As shown in FIG. 25, there are clearly eight possible bins, each representing a different location on the page, for different combinations of substantially white (or background color) quadrants.
4) In cases where the pages are small enough, or the image large enough, the system could also use page boundary information as a guide to locating user position.

This list is not meant to be an exhaustive but rather is representative of coarse discriminants that could possibly be used for presorting.

Style Parameters

The BSPM code and other routines used to find position in printed publications (such as publications with high graphic variability) are expected to reside on the same device or same server.

In a novel embodiment, the authoring system can be used to communicate various "style" parameters and other elements of the pre-processed printed publications to the run-time software, thus enabling the run-time software to select the optimal position finding method and speed up overall execution. The authoring system could acquire this information via operator input, a "style sheet" accompanying an electronic version of a document, through various tests on the document's scanned or bitmap image to determine salient features, or other means.

These features become part of the Chatterbox file and are so passed to the run-time system. For example, if a book has a background color with a certain RGB value, when the run-time software encounters an unbroken stretch of that color, it knows with some assurance that that is at a page, paragraph or column margin, etc. Similarly, if the authoring system determines that a particular print work has 12 point body text in black and 16 point headline text in blue, that information could also be time-saving, as the run-time image processing routines break the bitmap image from the imager into constituent text lines for BSPM processing.

In one example, the system could operate as follows:

The authoring system conveys style parameters to the Chatterbox device (or server software) detailing whether the contents it is operating on are text only (e.g., "Jane Austen") or graphically variable (e.g., "Time Magazine") or both. The system knows and can accommodate various key aspects of the hardware environment, such as: dedicated device (with known image resolution and fixed reference point, etc.) vs. camera-phone (with differing resolutions, different distances from the page and imaging angles, different pointing mechanisms, etc.)

If the user is employing a dedicated device, and the content being viewed is exclusively text, the system immediately starts processing any images the user captures using BSPM or BSPM variants. If operating in mixed text/graphic materials, an initial assessment is performed on the user's selection and the system determines if it is text or graphics. It then selects among the several methods.

If the user is employing a "camera-phone" or other non-dedicated device and operating on text, the system can quickly determine if there is sufficient resolution to use one of the BSPM methods to detect word spaces, blank lines, paragraph endings and other gross features to determine position. If not, graphic finding techniques hinging on the page's shapes and colors, etc., may be used instead.

Other Techniques for Enhancing Performance

In addition to presorting and style parameters, the system uses a number of other techniques to enhance matching performance. For instance, the system can clock how long a user has spent on a particular gatefold. If the user requests a second selection in very quick succession after the first, chances are excellent that they are on the same gatefold, meaning that patterns from that gatefold should be checked early in the matching process.

If the user has taken slightly longer, they may have proceeded on to the next gatefold, or followed a "wraparound" or "jump" in the printed text, etc., so these patterns could be tested first for a match, and the audio pre-fetched as appropriate.

In another embodiment, total pattern-matching computational steps can be reduced for a multi-page volume by determining the page number either from the text or by having the user enter it him or herself.

The BSPM algorithm can be used to determine the page number from the text, since a page number typically contains no more than three decimal digits. The BSPM algorithm need not achieve absolute accuracy with respect to page numbers, because in the case of ambiguous page identification audio feedback to the user can allow the user to accept one of several possible outcomes.

An alternative technique can locate a page number by having the user press a pushbutton to indicate a page mode whereupon the image pointer images the Blank Space Pattern associated with the first word on the page. For a book with a few hundred pages, the total number of page number patterns searched is comparable to searching patterns within a page therefore the collisions and the computational time do not exceed those collisions and computation time of the BSPM algorithm for a single page.

In addition to these algorithmic approaches, there are a number of processor hardware enhancements that can be used to significantly accelerate the speed of pattern matching. The imaging device is assumed to have an ARM-class processor which itself provides enormous computing power at a relatively low price. Using a DSP chip or a Field Programmable Gate Array specifically designed to perform binary correlations in parallel might further enhance the speed of pattern matching.

It should be appreciated that other variations to and modifications of the above-described method and system for locating positions in printed material and delivering multimedia information may be made without departing from the inventive concepts described herein. Accordingly, the invention should not be viewed as limited except by the scope and spirit of the appended claims.

What is claimed is:

1. An apparatus for processing printed material comprising:
    a pre-processing module for optically scanning printed text and generating pre-processed patterns for sub-regions of the printed text, each pre-processed pattern including a unique signature;
    an input module for pointing to a designated location in the printed text and generating a designated localized sub-image including a pattern with a unique signature corresponding to the designated location;
    a comparison module for comparing the pattern of the designated localized sub-image to the pre-processed patterns for sub-regions of the printed text to locate the designated localized sub-image in the pre-processed patterns for sub-regions; and
    an output module for associating the located designated localized sub-image with a predetermined external action.

2. An apparatus of claim 1 in which the pre-processed patterns for sub-regions and the pattern of the designated localized sub-image are indexed to the word spaces surrounding each word within a page of scanned printed text such that only a single pattern is stored for each word on the page.

3. The apparatus of claim 1 in which each pre-processed pattern of the pre-processed patterns for sub-regions includes a pattern chosen from the group consisting of: a blank space pattern of the spaces between the characters in the pre-processed patterns for sub-regions, a blank space pattern of the spaces between the words in the pre-processed patterns for sub-regions, the position of blank lines within the pre-processed patterns for sub-regions, the spaces before and after each paragraph within pre-processed patterns for sub-regions, and any combination thereof.

4. The apparatus of claim 1 in which the pattern for the designated localized sub-image includes a pattern chosen from the group consisting of: a blank space pattern of the spaces between the characters in the designated localized sub-image, a blank space pattern of the spaces between the words in the designated localized sub-image, the position of blank lines within the designated localized sub-image, the spaces before and after each paragraph within the designated localized sub-image, and any combination thereof.

5. The apparatus of claim 1 in which the pre-processing module generates one or more metrics from the pre-processed patterns for sub-regions of the printed text.

6. The apparatus of claim 5 in which the pre-processing module subdivides the pre-processed patterns for sub-regions into a plurality of bins based on the one or more metrics.

7. The apparatus of claim 5 in which the one or more metrics include the sum of all blank space widths in a given section of the pre-processed patterns for sub-regions.

8. The apparatus of claim 7 in which the sum of the blank space widths is taken over a plurality of lines of the pre-processed patterns for sub-regions.

9. The apparatus of claim 5 in which the one or more metrics include the percentage of white space in a given section of the pre-processed patterns for sub-regions.

10. The apparatus of claim 5 in which the one or more metrics include the length of the last line in at least one paragraph in the pre-processed patterns for sub-regions.

11. The apparatus of claim 6 in which the input module generates one or more metrics from the pattern of the designated localized sub-image.

12. The apparatus of claim 11 in which a metric associated with the pattern of the designated localized sub-image is coarsely compared with the one or more metrics subdivided in the plurality of bins to locate the bin having the best match therebetween.

13. The apparatus of claim 12 in which the matched bin is searched to locate a match between the pattern of the designated localized sub-image and the pre-processed patterns for sub-regions.

14. The apparatus of claim 5 in which the one or more metrics are stored in a database.

15. The apparatus of claim 1 further including a display for displaying a portion of the printed text.

16. The apparatus of claim 1 in which the pre-processed patterns for sub-regions and/or the pattern of the designated localized sub-image are stored on a medium accessible by the comparison module.

17. The apparatus of claim 16 in which the medium is a medium chosen from the group consisting of: a CD ROM, a DVD, a memory device, and magnetic media.

18. The apparatus of claim 1 in which the pre-processed patterns for sub-regions and/or the pattern for the designated localized sub-regions are stored on a server and available to the comparison module via a network.

19. The apparatus of claim 18 in which the network is a network chosen from the group consisting of: the Internet, a local area network, a wide area network, and a wireless network.

20. The apparatus of claim 1 in which the input module includes an imager for imaging a sub-image of the printed text and a pointing device such that an image of the pointing device is superimposed on the sub-image of the printed text.

21. The apparatus of claim 1 in which the input module includes an imager and a pointing device fixed to the imager, the imager for scanning a sub-image of the printed text and the pointing device.

22. The apparatus of claim 1 in which the pointing device is chosen from the group consisting of: a stylus, a pencil, a finger, a pointed arrow, and a light beam placed at a user indicated position.

23. The apparatus of claim 1 in which the predetermined external action provides output chosen from the group consisting of: a graphical image, a video image, a multimedia image, a link to an internet site, a trigger to program logic in software, and an audio output.

24. The apparatus of claim 1 in which the designated localized sub-image comprises between about 10 and 30 adjacent character spaces located on about 3 to 4 adjacent lines.

25. The apparatus of claim 1 in which the scanned text includes a character set chosen from the group consisting of: Latin, Hebrew, Chinese, Japanese, Cyrillic, Devanagari, and Arabic.

* * * * *